(12) United States Patent
Walker et al.

(10) Patent No.: US 11,692,389 B2
(45) Date of Patent: Jul. 4, 2023

(54) COMPOSITE DOORS AND METHODS OF FORMING THEREOF

(71) Applicant: The Boeing Company, Chicago, IL (US)

(72) Inventors: Steven P. Walker, Arlington, WA (US); Perlas G. Martinez, Everett, WA (US)

(73) Assignee: The Boeing Company, Chicago, IL (US)

( * ) Notice: Subject to any disclaimer, the term of this patent is extended or adjusted under 35 U.S.C. 154(b) by 224 days.

(21) Appl. No.: 16/898,269

(22) Filed: Jun. 10, 2020

(65) Prior Publication Data

US 2021/0388668 A1 Dec. 16, 2021

(51) Int. Cl.
*E06B 3/78* (2006.01)
*E06B 3/70* (2006.01)
*B64C 1/14* (2006.01)

(52) U.S. Cl.
CPC .............. *E06B 3/78* (2013.01); *E06B 3/7001* (2013.01); *E06B 3/7015* (2013.01); *B64C 1/1407* (2013.01)

(58) Field of Classification Search
CPC ........ E06B 3/78; E06B 3/7015; E06B 3/7001; B64C 1/1407; B64C 1/1461
See application file for complete search history.

(56) References Cited

U.S. PATENT DOCUMENTS

| 10,179,438 B2 | 1/2019 | Tessier et al. | |
| 2002/0008179 A1* | 1/2002 | Bluem | B64C 1/1461 244/129.5 |
| 2009/0146008 A1* | 6/2009 | Thiele | B64C 1/1461 244/119 |
| 2010/0294888 A1 | 11/2010 | Texcier et al. | |
| 2011/0186683 A1 | 8/2011 | Lonsdorfer et al. | |
| 2021/0214065 A1* | 7/2021 | Devillez | B64C 1/1461 |
| 2022/0153401 A1* | 5/2022 | Devillez | B64C 1/1461 |

FOREIGN PATENT DOCUMENTS

CN 201933973 U 8/2011

OTHER PUBLICATIONS

European Application Serial No. 21167489.0, Search Report dated Sep. 2, 2021, 8 pgs.
Communication pursuant to Article 94(3) EPC for EP21167489.0 dated Jan. 2, 2023, 6 pgs.

* cited by examiner

Primary Examiner — Beth A Stephan
(74) Attorney, Agent, or Firm — Kwan & Olynick LLP

(57) ABSTRACT

A composite door comprises a composite frame, which comprises a first rail, a second rail, and crossbeams, joining the first rail and the second rail. The composite door also comprises a first composite side beam, a second composite side beam, and a composite skin, connected to each of the crossbeams of the composite frame, to the first composite side beam, and to the second composite side beam. The composite door further comprises first composite edge fittings, each connected to a corresponding one of the crossbeams of the composite frame, to the first composite side beam, and to the composite skin, and second composite edge fittings, each connected to a corresponding one of the crossbeams of the composite frame, to the second composite side beam, and to the composite skin.

20 Claims, 22 Drawing Sheets

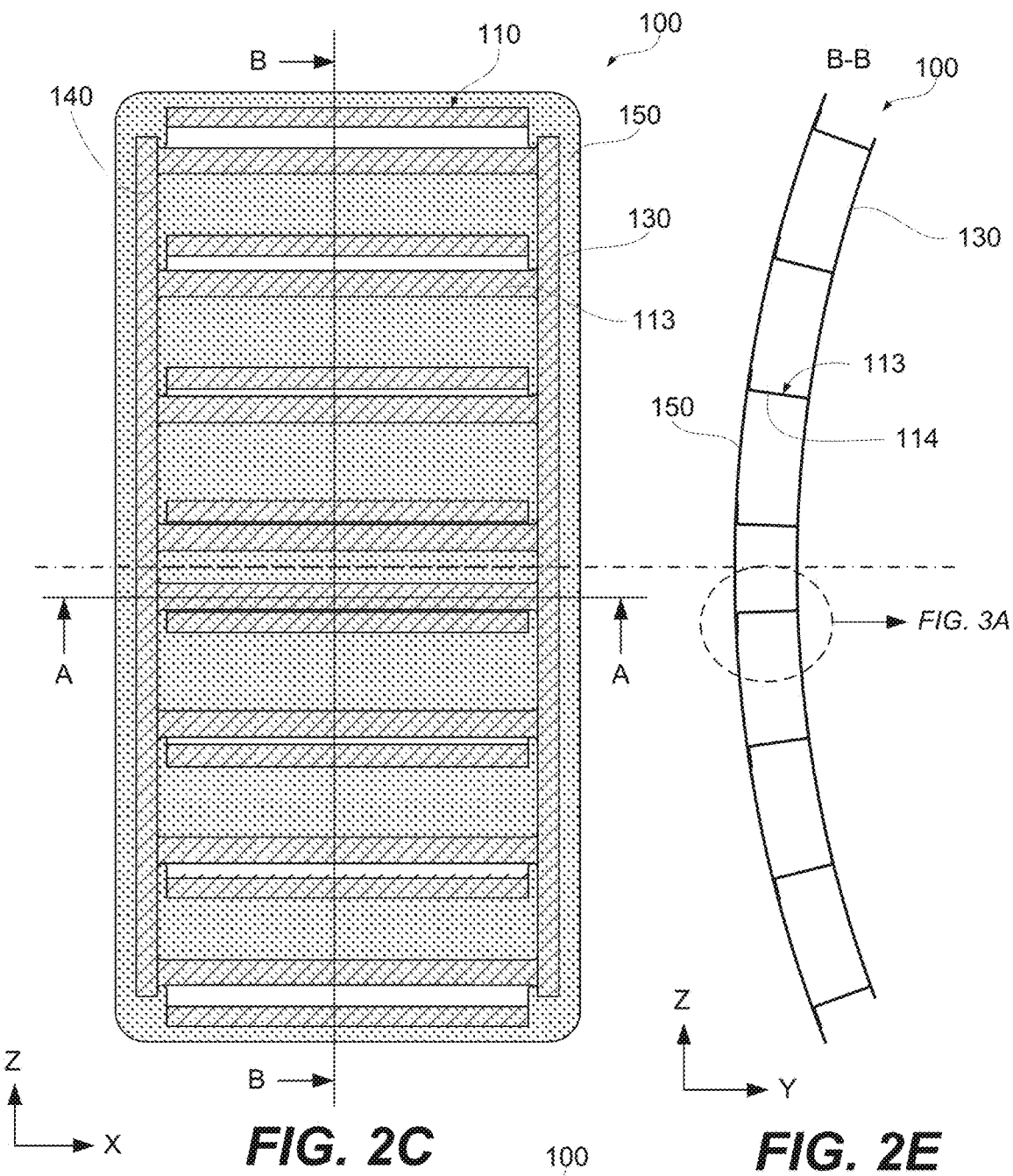
FIG. 2C
FIG. 2E
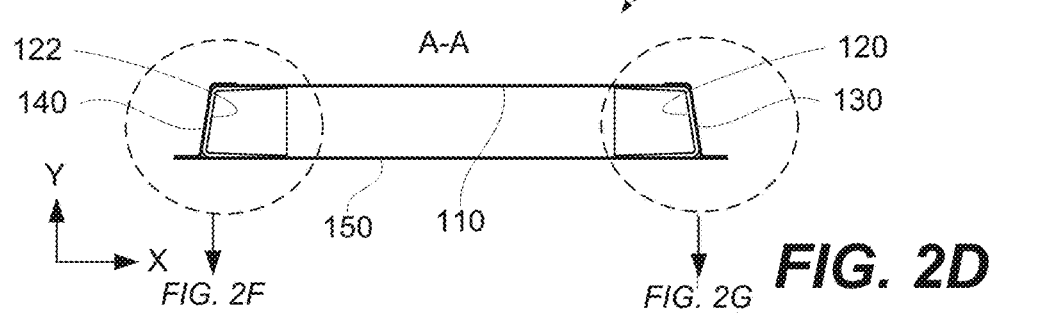
FIG. 2D

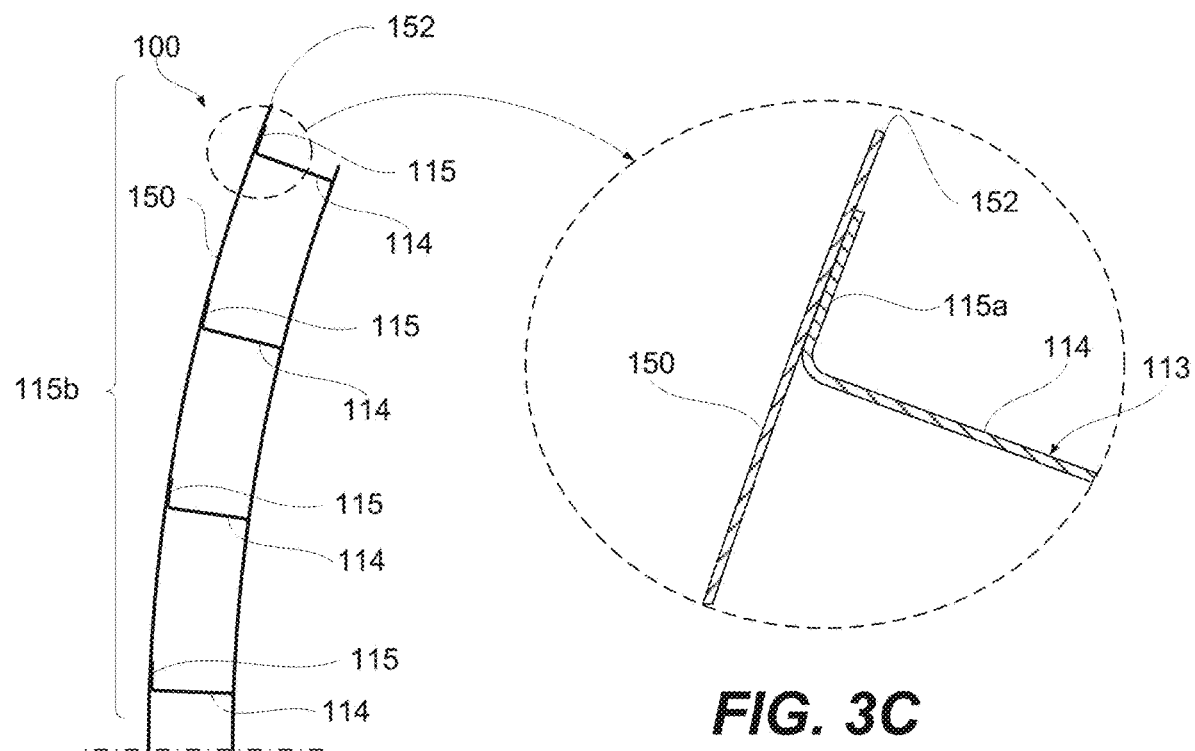
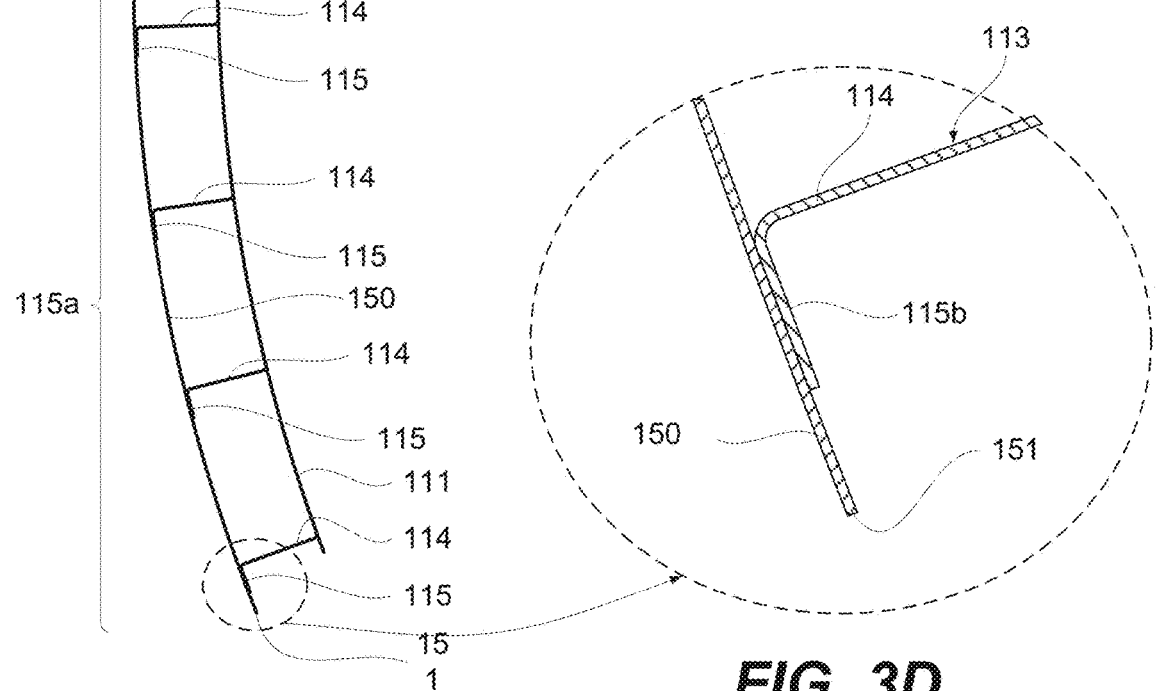
FIG. 3B
FIG. 3C
FIG. 3D

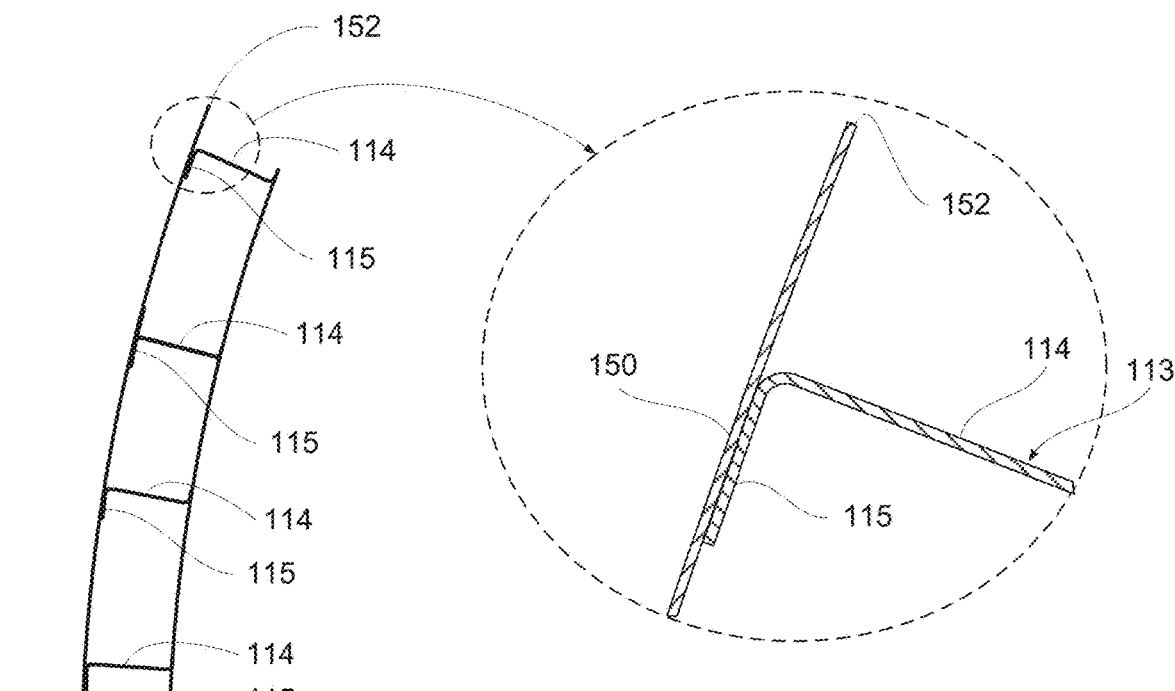
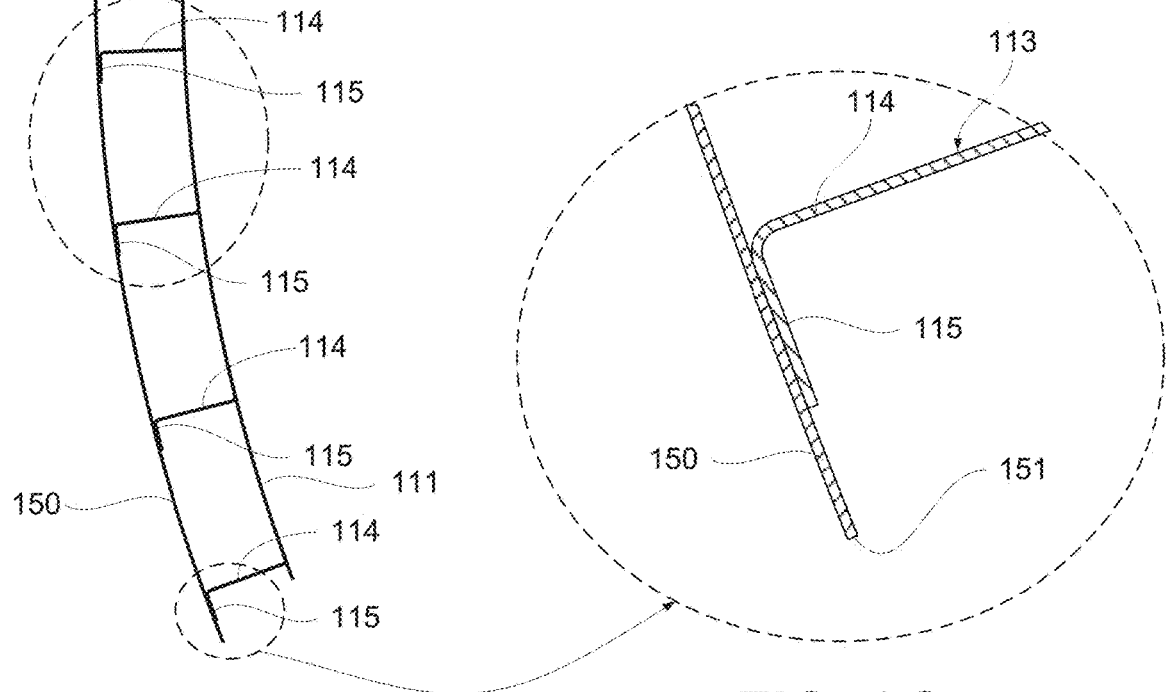
FIG. 3E
FIG. 3F
FIG. 3G

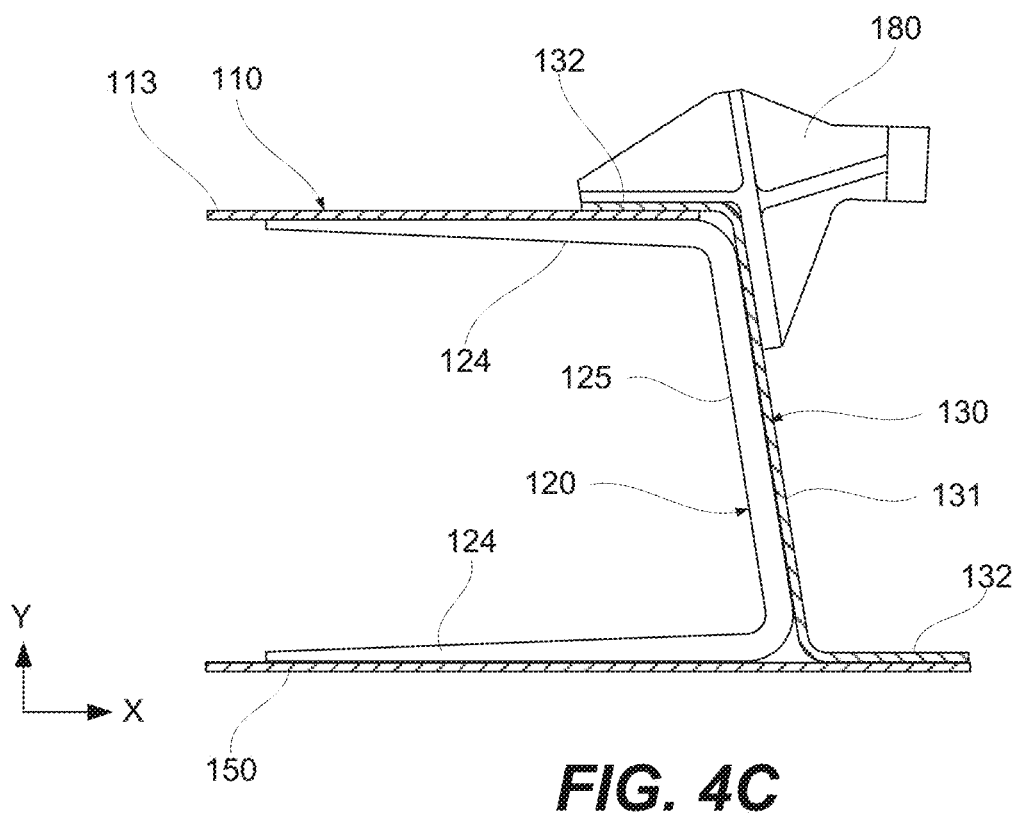
FIG. 4C
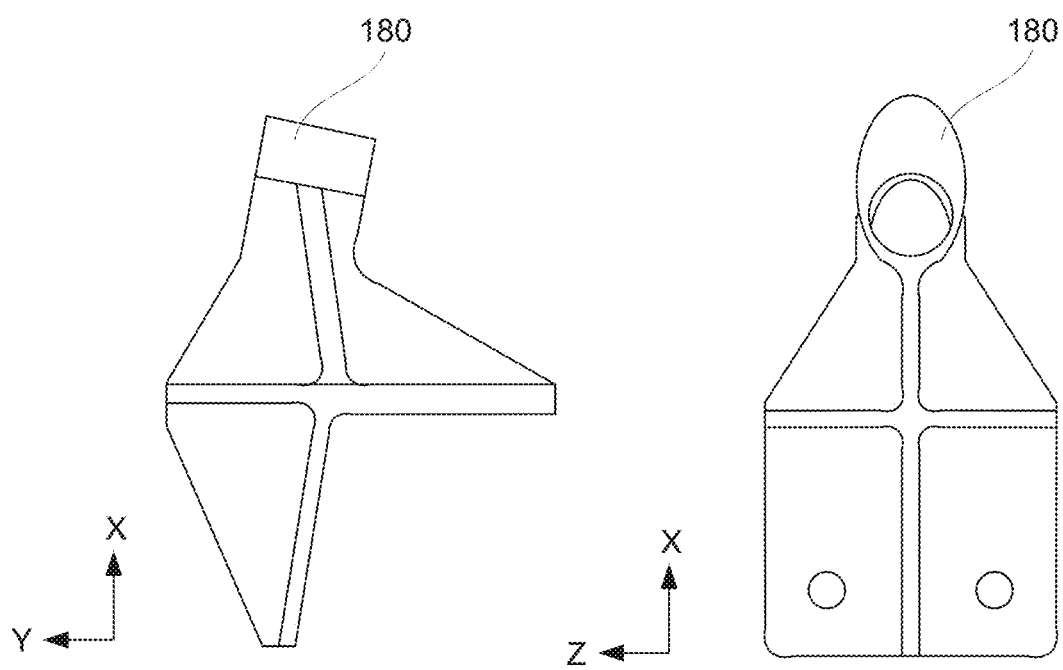
FIG. 4D  FIG. 4E

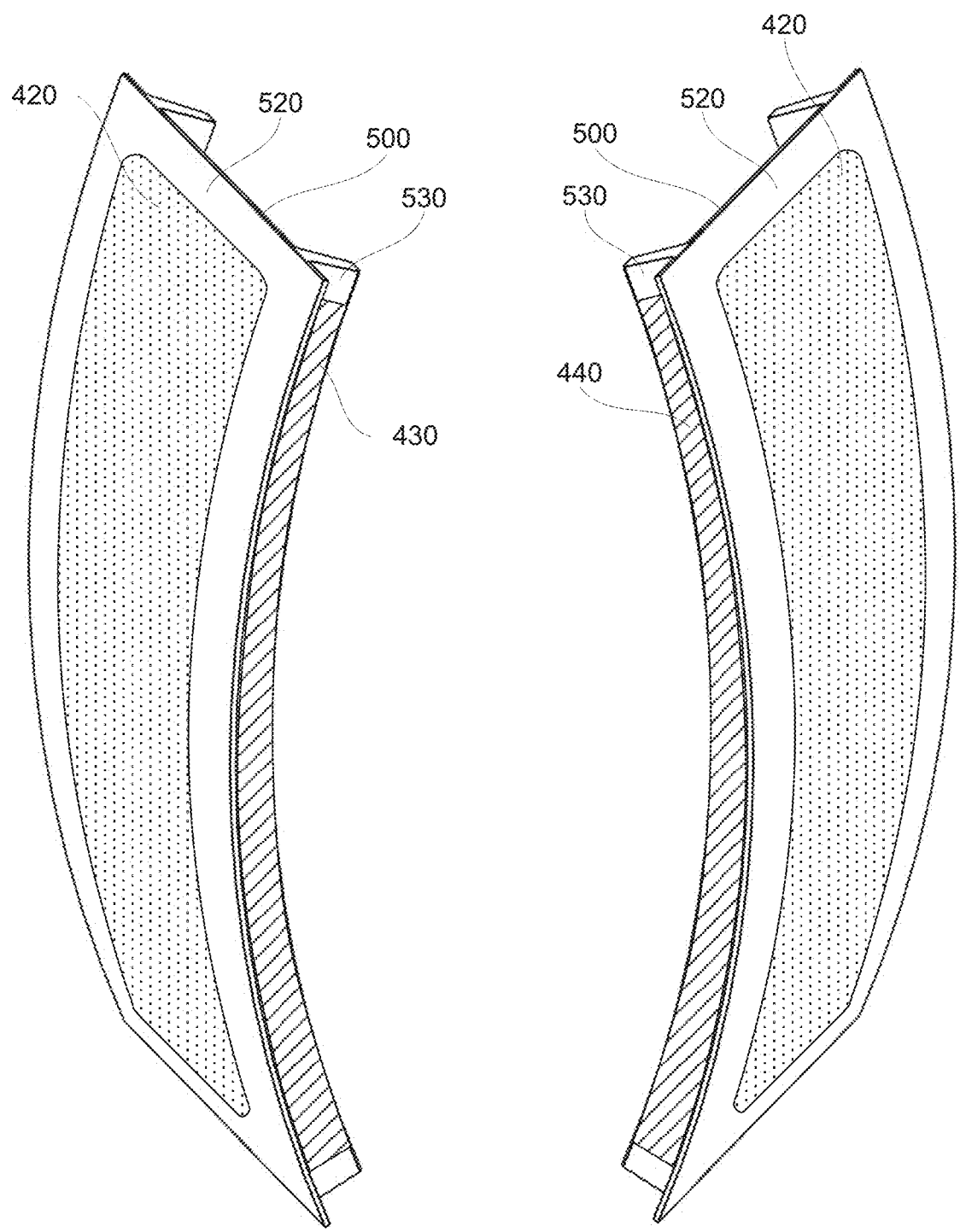
*FIG. 7E*     *FIG. 7F*

COMPOSITE DOORS AND METHODS OF FORMING THEREOF

TECHNICAL FIELD

The subject matter, disclosed herein, relates to composite doors and methods of forming thereof.

BACKGROUND

Conventional doors used in vehicles, such as aircraft, are typically made from metal. Such doors are often heavy, which is highly undesirable for many applications, such as aircraft. Furthermore, metal components of these doors can be susceptible to corrosion and often require special protection and periodic inspection, which can be resource-intensive. Finally, conventional doors typically include many different parts, joined together using various types of fasteners. Each part is independently fabricated, which adds to the overall process complexity and cost, associated with conventional doors.

SUMMARY

Accordingly, apparatuses and methods, intended to address at least the above-identified concerns, would find utility.

The following is a non-exhaustive list of examples, which may or may not be claimed, of the subject matter, disclosed herein.

Disclosed herein is a composite door, comprising a composite frame that comprises a first rail, a second rail, and crossbeams, joining the first rail and the second rail. The composite door also comprises a first composite side beam, a second composite side beam, and a composite skin, connected to each of the crossbeams of the composite frame, to the first composite side beam, and to the second composite side beam. The composite door additionally comprises first composite edge fittings, each connected to a corresponding one of the crossbeams of the composite frame, to the first composite side beam, and to the composite skin. The composite door further comprises second composite edge fittings, each connected to a corresponding one of the crossbeams of the composite frame, to the second composite side beam, and to the composite skin.

Composite door 100 is lighter that conventional door, such as metal doors or, more specifically, aluminum doors. Composite door 100 has a lower risk of environmental deterioration (e.g., corrosion) in comparison to conventional metal doors. Furthermore, composite door 100 has fewer parts, such as composite frame 110, first composite side beam 130, second composite side beam 140, and composite skin 150. Composite skin 150 provides isolation and protection from the outside environment, while composite frame 110, first composite side beam 130, and second composite side beam 140 provide support to composite skin 150, e.g., enabling composite skin 150 to support a pressure differential across composite door 100. First composite edge fittings 120, and second composite edge fittings 122 provide connection between composite frame 110, first composite side beam 130, second composite side beam 140, and composite skin 150 and provide additional mechanical support to these comments.

Also disclosed herein is a method of forming a composite door. The method comprises forming a precursor frame sheet, comprising flaps, by cutting a prepreg sheet. The method also comprises draping the precursor frame sheet over a door-forming tool, which comprises a frame face and flap supports, non-parallel to the frame face. The precursor frame sheet is draped over the door-forming tool such that each of the flaps of the precursor frame sheet is geometrically complementary with a corresponding one of the flap supports. The method also comprises forming a composite frame by curing the precursor frame sheet, draped over the door-forming tool. The method additional comprises separating the composite frame from the door-forming tool and interconnecting the composite frame, first composite edge fittings, second composite edge fittings, a first composite side beam, a second composite side beam, and a composite skin.

Various components of composite door 100 are formed from prepreg sheets, which provide precise control over material consistency than, e.g., composite layups. For example, composite frame 110 is formed from prepreg sheet 400, which is cut and formed into the shape of composite frame 110. Furthermore, these prepreg sheets enable integration of different features, such as different components of composite frame 110. Composite door 100 is lighter that conventional door, such as metal doors or, more specifically, aluminum doors. Composite door 100 has a lower risk of environmental deterioration (e.g., corrosion) in comparison to conventional metal doors. Furthermore, composite door 100 has fewer parts, such as composite frame 110, first composite side beam 130, second composite side beam 140, and composite skin 150.

BRIEF DESCRIPTION OF THE DRAWINGS

Reference will now be made to the accompanying drawings, which are not necessarily drawn to scale, and where like reference characters designate the same or similar parts throughout the several views. In the drawings:

FIG. 2C is a schematic top view of the composite door of FIG. 1, according to one or more examples of the subject matter, disclosed herein;

FIGS. 2D and 2E are two schematic cross-sectional views of the composite door of FIG. 1, according to one or more examples of the subject matter, disclosed herein;

FIG. 3B is a schematic cross-sectional view of the composite door of FIG. 1, according to one or more examples of the subject matter, disclosed herein;

FIGS. 3C and 3D are schematic cross-sectional views of two portions of the composite door of FIG. 1, showing different orientations of crossbeam supports, according to one or more examples of the subject matter, disclosed herein;

FIG. 3E is a schematic cross-sectional view of the composite door of FIG. 1, according to one or more examples of the subject matter, disclosed herein;

FIGS. 3F and 3G are schematic cross-sectional views of two portions of the composite door of FIG. 1, showing similar orientations of crossbeam supports, according to one or more examples of the subject matter, disclosed herein;

FIGS. 4D and 4E are two schematic views of a stop fitting of the composite door of FIG. 1, according to one or more examples of the subject matter, disclosed herein;

FIGS. 7E and 7F are perspective schematic views of the door-forming tool of FIG. 7A, illustrating a first beam prepreg sheet, a second beam prepreg sheet, and a skin prepreg sheet, processed using the door-forming tool, used for forming the composite door of FIG. 1, according to one or more examples of the subject matter, disclosed herein;

DETAILED DESCRIPTION

Figure 1:
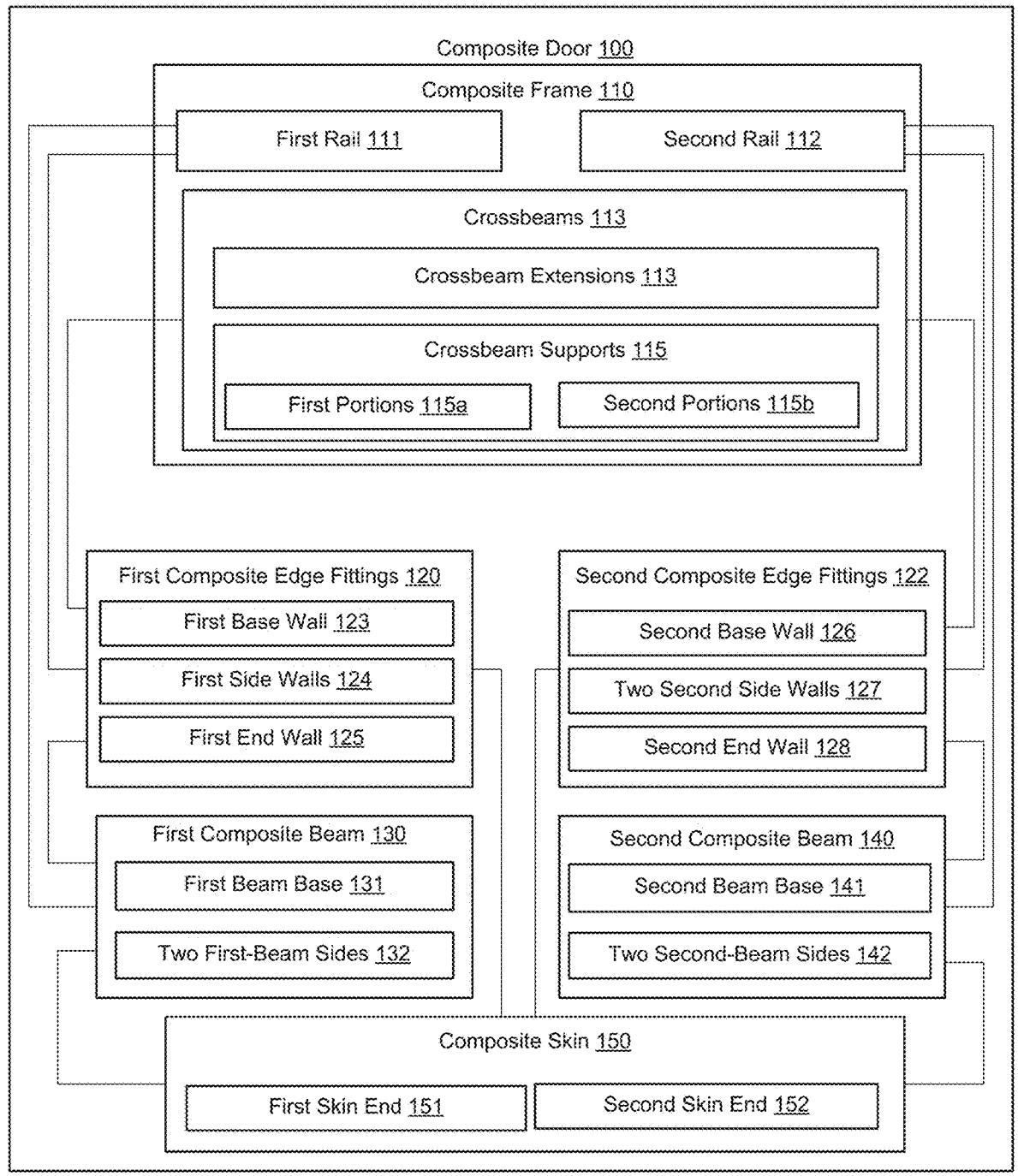
FIG. 1 is a block diagram of a composite door, according to one or more examples of the subject matter, disclosed herein.

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate alternative examples of the subject matter, disclosed herein. Likewise, elements and/or components, if any, represented with dashed lines, indicate alternative examples of the subject matter, disclosed herein. One or more elements shown in solid and/or dashed lines may be omitted from a particular example without departing from the scope of the subject matter, disclosed herein. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

Figure 8:
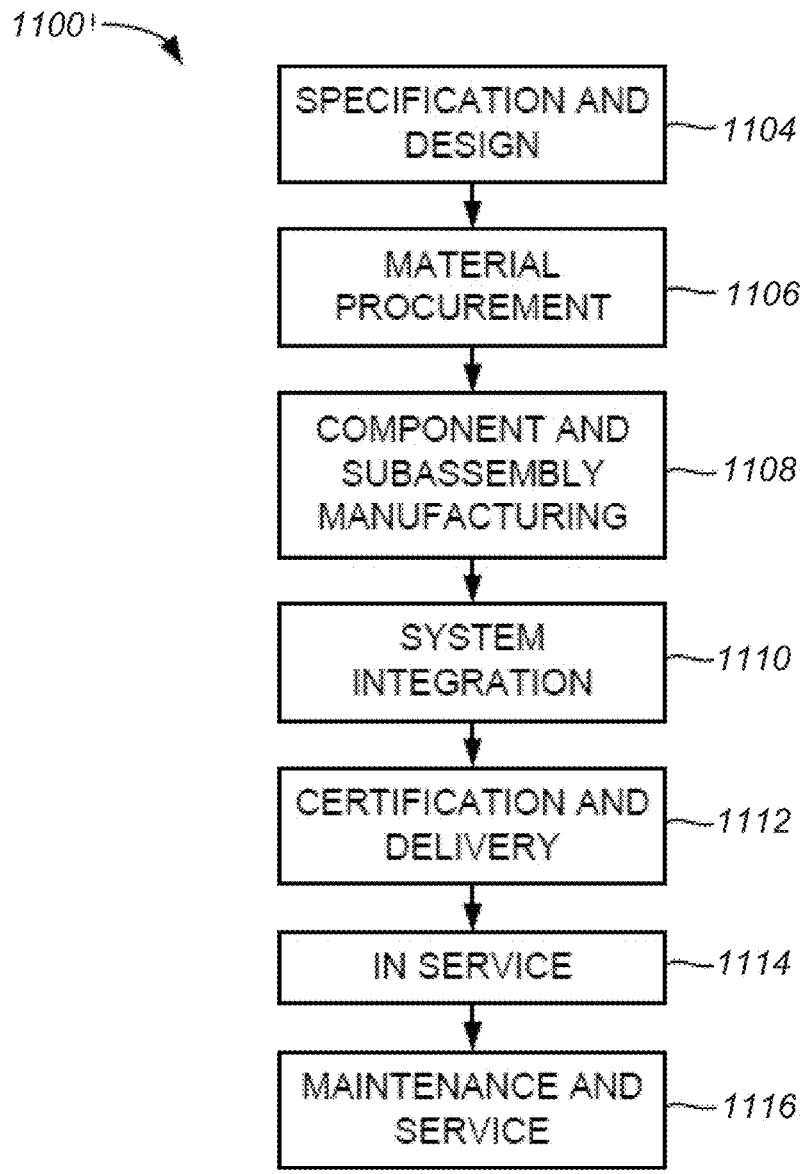
FIG. 8 is a block diagram of aircraft production and service methodology.
Figure 9:
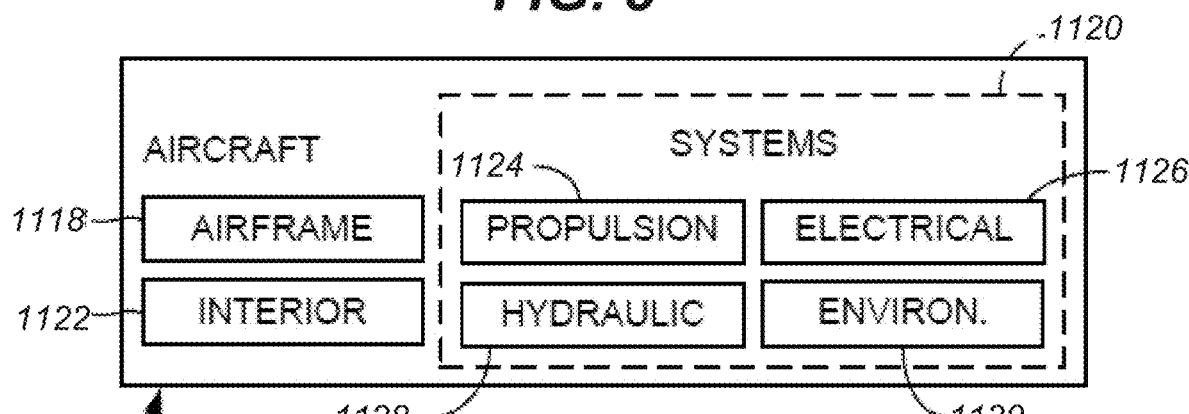
FIG. 9 is a schematic illustration of an aircraft.

In FIGS. 8 and 9, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 8 and 9 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one or more examples" means that one or more feature, structure, or characteristic described in connection with the example is included in at least one implementation. The phrase "one or more examples" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter, disclosed herein, are provided below.

Referring generally to FIG. 1 and particularly to, e.g., FIGS. 2A-3H for illustrative purposes only and not by way of limitation, composite door 100 is disclosed. Composite door 100 comprises composite frame 110, which comprises first rail 111, second rail 112, and crossbeams 113, joining first rail 111 and second rail 112. Composite door 100 also comprises first composite side beam 130, second composite side beam 140, and composite skin 150, connected to each of crossbeams 113 of composite frame 1:10, to first composite side beam 130, and to second composite side beam 140. Composite door 100 further comprises first composite edge fittings 120, each connected to a corresponding one of crossbeams 113 of composite frame 110, to first composite side beam 130, and to composite skin 150. Composite door 100 additionally comprises second composite edge fittings 122, each connected to a corresponding one of crossbeams 113 of composite frame 110, to second composite side beam 140, and to composite skin 150. The preceding portion of this paragraph characterizes example 1 of the subject matter, disclosed herein.

Composite door 100 is lighter that conventional door, such as metal doors or, more specifically, aluminum doors. Composite door 100 has a lower risk of environmental deterioration (e.g., corrosion) in comparison to conventional metal doors. Furthermore, composite door 100 has fewer parts, such as composite frame 110, first composite side beam 130, second composite side beam 140, and composite skin 150. Composite skin 150 provides isolation and protection from the external environment, while composite frame 110, first composite side beam 130, and second composite side beam 140 provide support to composite skin 150, e.g., enabling composite skin 150 to support a pressure differential across composite door 100. First composite edge fittings 120, and second composite edge fittings 122 provide connection between composite frame 110, first composite side beam 130, second composite side beam 140, and composite skin 150 and provide additional mechanical support to these comments.

First rail 111 and second rail 112 of composite frame 110 extend along the height of composite door 100, e.g., between first skin end 151 and second skin end 152 of composite skin 150. In some examples, first rail 111 and second rail 112 extend parallel to each other. More specifically, first rail 111 extends along and is connected to first composite side beam 130, while second rail 112 extends along and is connected to second composite side beam 140. First composite side beam 130 also interconnects first rail 111 to composite skin 150. Second composite side beam 140 interconnects second rail 112 to composite skin 150.

First rail 111 and second rail 112 join crossbeams 113, which extend between first rail 111 and second rail 112. In some examples, first rail 111, second rail 112, and crossbeams 113 are all formed from the same starting component, e.g., a prepreg sheet, as further described below. Therefore, no separate connections are needed between first rail 111, second rail 112, and crossbeams 113.

Figure 2A:
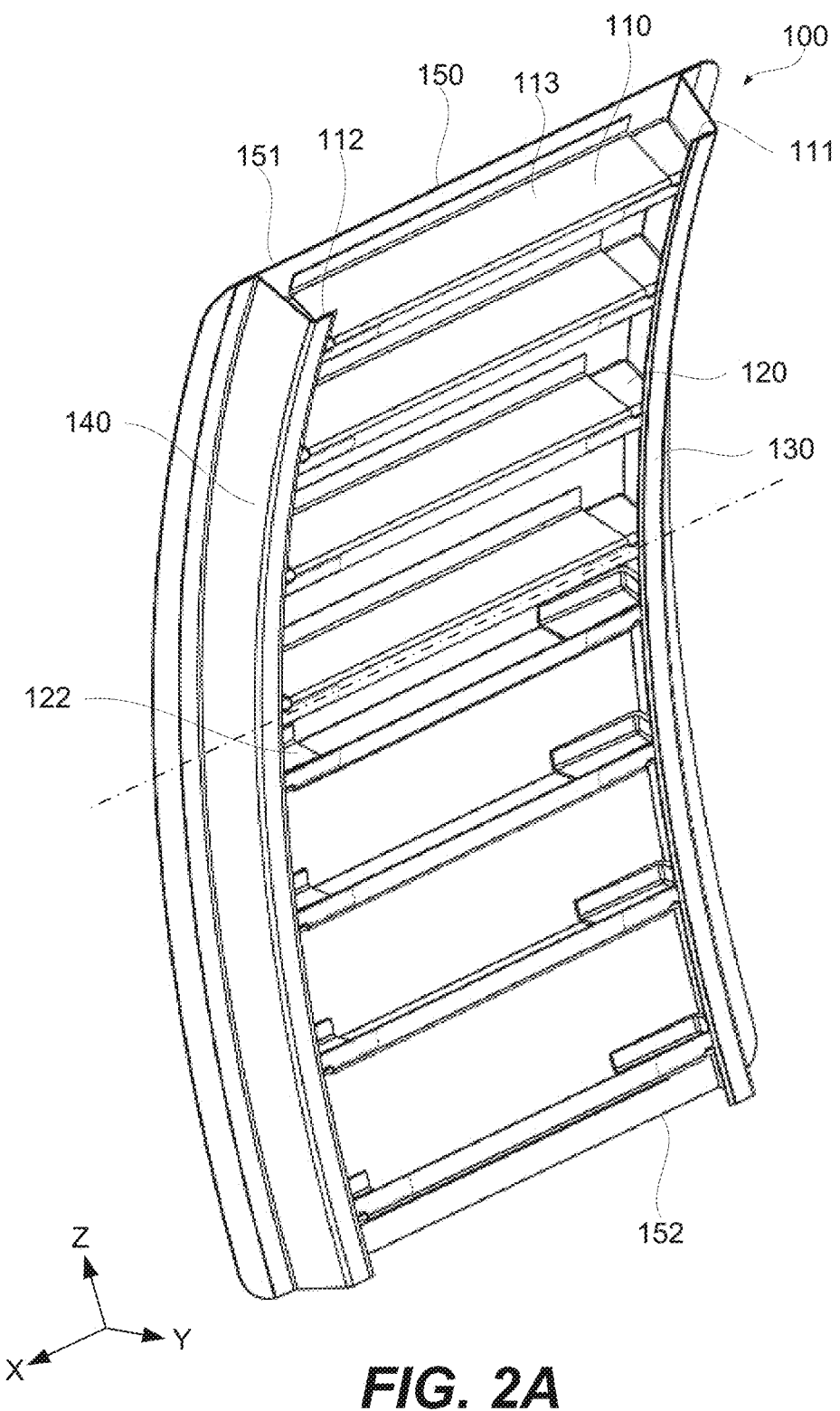
FIG. 2A is a schematic perspective view of the composite door of FIG. 1, according to one or more examples of the subject matter, disclosed herein.
Figure 2B:
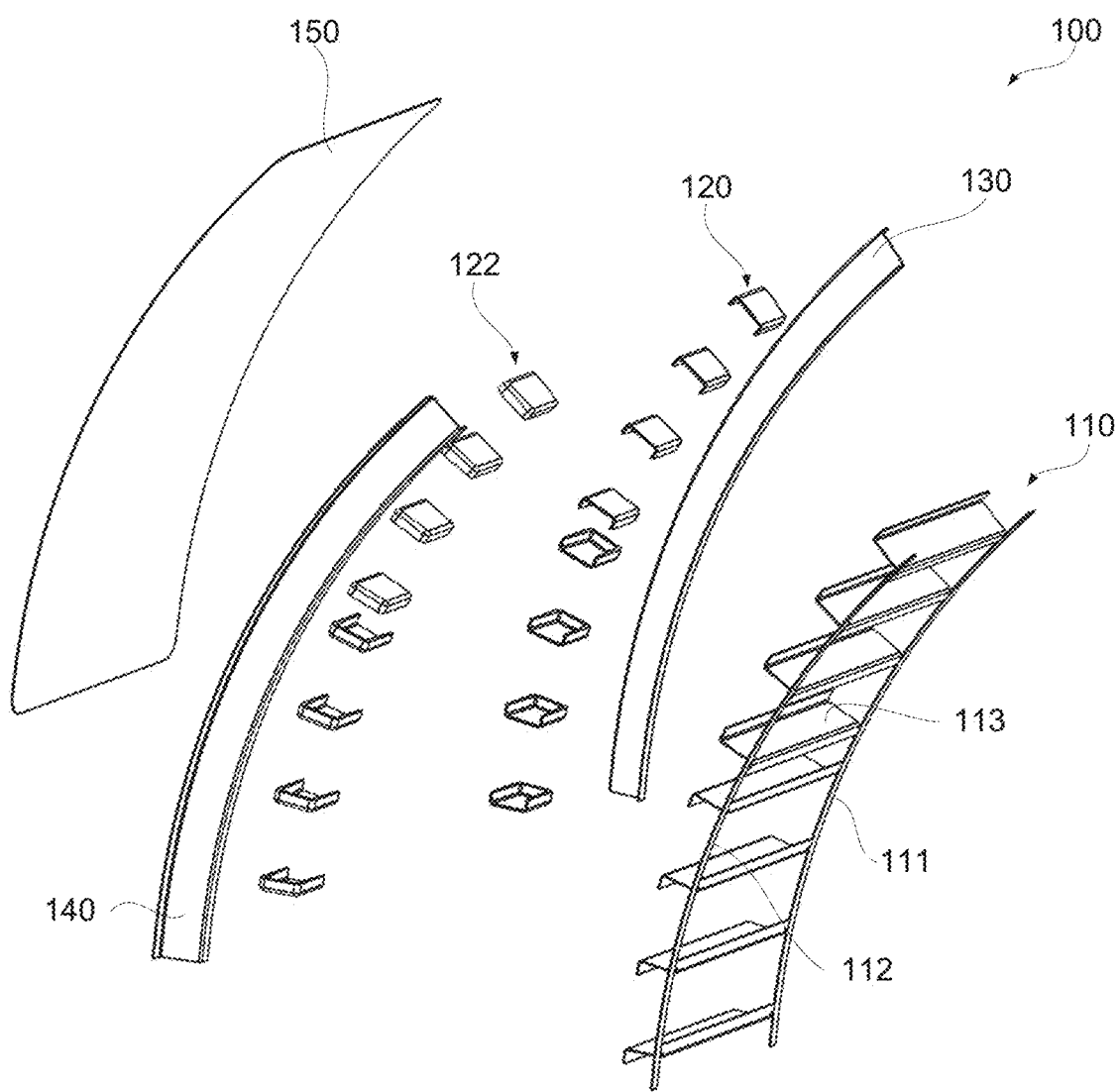
FIG. 2B is a schematic exploded view of the composite door of FIG. 1, according to one or more examples of the subject matter, disclosed herein.

Crossbeams 113 are distributed along the height of composite door 100. In some examples, crossbeams 113 are equally spaced to provide uniform support to composite skin 150. Portions of crossbeams 113 are directly connected to composite skin 150. While FIGS. 2A and 2B illustrate composite door 100 comprising eight crossbeams 113, any number of crossbeams 113 is within the contemplated scope. The number of crossbeams 113 depends on the thickness of composite door 100 (defined in part by crossbeams 113) and the height of composite door 100.

First composite side beam 130 and second composite side beam 140 extend along the height of composite door 100, e.g., between first skin end 151 and second skin end 152 of composite skin 150. In some examples, first composite side beam 130 and second composite side beam 140 extend parallel to each other. First composite side beam 130 and second composite side beam 140 provide support to composite skin 150 along edges of composite skin 150. In some examples, first composite side beam 130 and second composite side beam 140 have the same shape and are replaceable. For example, the curvature radius of first composite side beam 130 and second composite side beam 140 is continuous.

First composite edge fittings 120 interconnect a corresponding one of crossbeams 113 of composite frame 110, first composite side beam 130, and composite skin 150. Similarly, second composite edge fittings 122 interconnect a corresponding one of crossbeams 113, second composite side beam 140, and composite skin 150. Addition of first composite edge fittings 120 and second composite edge fittings 122 simplifies the design of composite frame 110, while providing robust connections between composite frame 110, first composite side beam 130, and composite skin 150. For example, each of first composite edge fittings 120 and second composite edge fittings 122 comprises multiple sides, designed to connect to various components of composite door 100, as further described below.

Figure 2F:
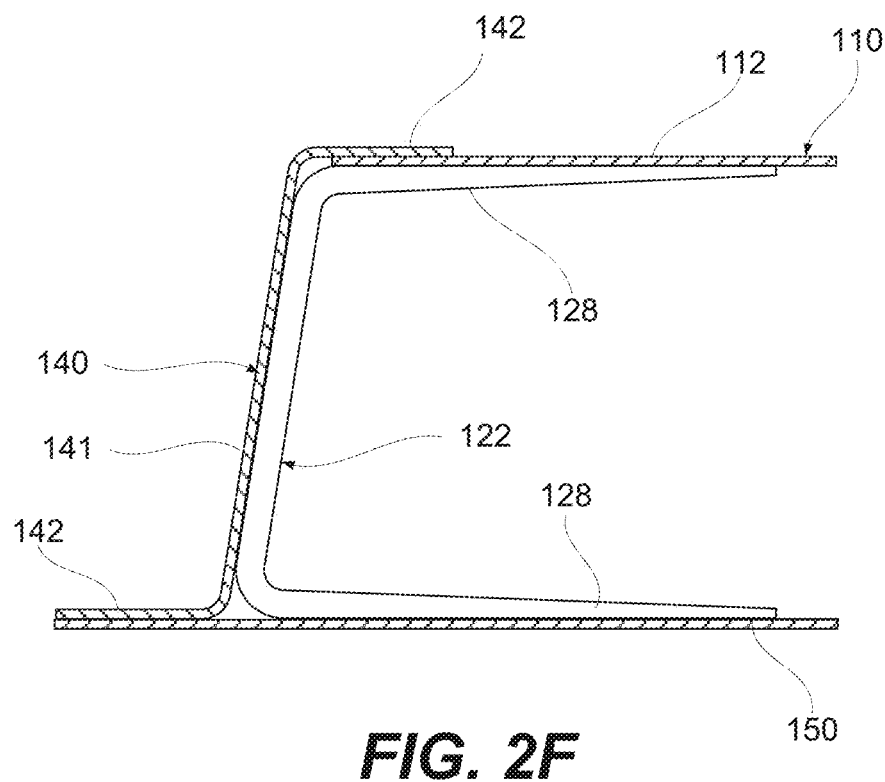
FIGS. 2F and 2G are schematic cross-sectional views of two portions of the composite door of FIG. 1, according to one or more examples of the subject matter, disclosed herein.
Figure 2G:
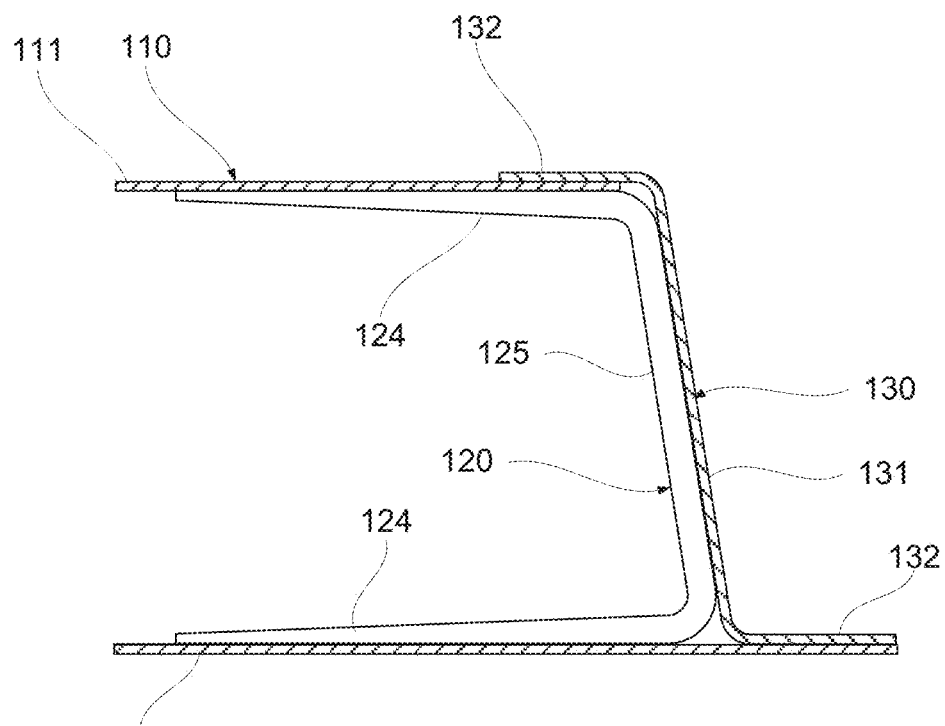

Referring generally to FIG. 1 and particularly to, e.g., FIGS. 2D, 2F, and 2G for illustrative purposes only and not by way of limitation, first composite side beam 130 is connected to first rail 111 of composite frame 110, and second composite side beam 140 is connected to second rail 112 of composite frame 110. The preceding portion of this paragraph characterizes example 2 of the subject matter, disclosed herein, where example 2 also encompasses example 1, above.

The connection between composite frame 110 and each of first composite side beam 130 and second composite side beam 140 provides additional rigidity to composite frame 110, in particular, around first rail 111 and second rail 112 of composite frame 110. This connection enables the use of lighter structures for composite frame 110, first composite side beam 130, and second composite side beam 140.

In some examples, first rail 111 of composite frame 110 directly interfaces and is stacked with first composite side beam 130, e.g., is shown in FIG. 2G. For example, first rail 111 is positioned between one of first composite edge fittings 120 (e.g., one of two first side walls 124 of this first composite edge fitting) and first composite side beam 130. In some examples, the connection between first rail 111 and first composite side beam 130 also serves as a connection to the aforementioned one of first composite edge fittings 120.

Furthermore, in some examples, second rail 112 of composite frame 110 directly interfaces and is stacked with second composite side beam 140, e.g., is shown in FIG. 2F. For example, second rail 112 is positioned between one of second composite edge fittings 122 (e.g., one of two second side walls 127 of this second composite edge fitting) and second composite side beam 140. In some examples, the connection between second rail 112 and second composite side beam 140 also serves as a connection to the aforementioned one of second composite edge fittings 122.

Referring generally to FIG. 1 and particularly to, e.g., FIG. 2G for illustrative purposes only and not by way of limitation, first composite side beam 130 comprises first-beam base 131 and two first-beam sides 132, non-parallel to first-beam base 131. First-beam base 131 is connected to each of first composite edge fittings 120. First one of two first-beam sides 132 is connected to first rail 111 of composite frame 110. Second one of two first-beam sides 132 is connected to composite skin 150. The preceding portion of this paragraph characterizes example 3 of the subject matter, disclosed herein, where example 3 also encompasses example 1 or 2, above.

The connection between composite frame 110 and first composite side beam 130 provides additional rigidity to composite frame 110, in particular, around first rail 111 of composite frame 110 and also around composite skin 150 and first composite edge fittings 120. Furthermore, first-beam base 131 provides spacing between two first-beam sides 132 and, as a result, spacing between first rail 111 and composite skin 150, thereby improving the overall mechanical strength of composite door 100. This connection enables the use of lighter structures for composite frame 110, first composite side beam 130, and composite skin 150.

As shown in FIG. 2G, first-beam base 131 extends between and interconnects two first-beam sides 132. Two first-beam sides 132 are non-parallel to first-beam base 131. In some examples, two first-beam sides 132 are parallel to each other, e.g., when first rail 111 is parallel to a corresponding portion of composite skin 150.

Referring generally to FIG. 1 and particularly to, e.g., FIG. 2F for illustrative purposes only and not by way of limitation, second composite side beam 140 comprises second-beam base 141 and two second-beam sides 142, non-parallel to second-beam base 141. Second-beam base 141 is connected to each of second composite edge fittings 122. A first one of two second-beam sides 142 is connected to second rail 112 of composite frame 110. A second one of two second-beam sides 142 is connected to composite skin 150. The preceding portion of this paragraph characterizes example 4 of the subject matter, disclosed herein, where example 4 also encompasses any one of examples 1 to 3, above.

The connection between composite frame 110 and second composite side beam 140 provides additional rigidity to composite frame 110, in particular, around second rail 112 of composite frame 110 and also around composite skin 150 and second composite edge fittings 122. Furthermore, second-beam base 141 provides spacing between two second-beam sides 142 and, as a result, spacing between second rail 112 and composite skin 150, thereby improving the overall mechanical strength of composite door 100. This connection enables the use of lighter structures for composite frame 110, second composite side beam 140, second composite edge fittings 122, and composite skin 150.

As shown in FIG. 2F, second-beam base 141 extends between and interconnects two second-beam sides 142. Two second-beam sides 142 are non-parallel to second-beam base 141. In some examples, two second-beam sides 142 are parallel to each other, e.g., when second rail 112 is parallel to a corresponding portion of composite skin 150.

Figure 3A:
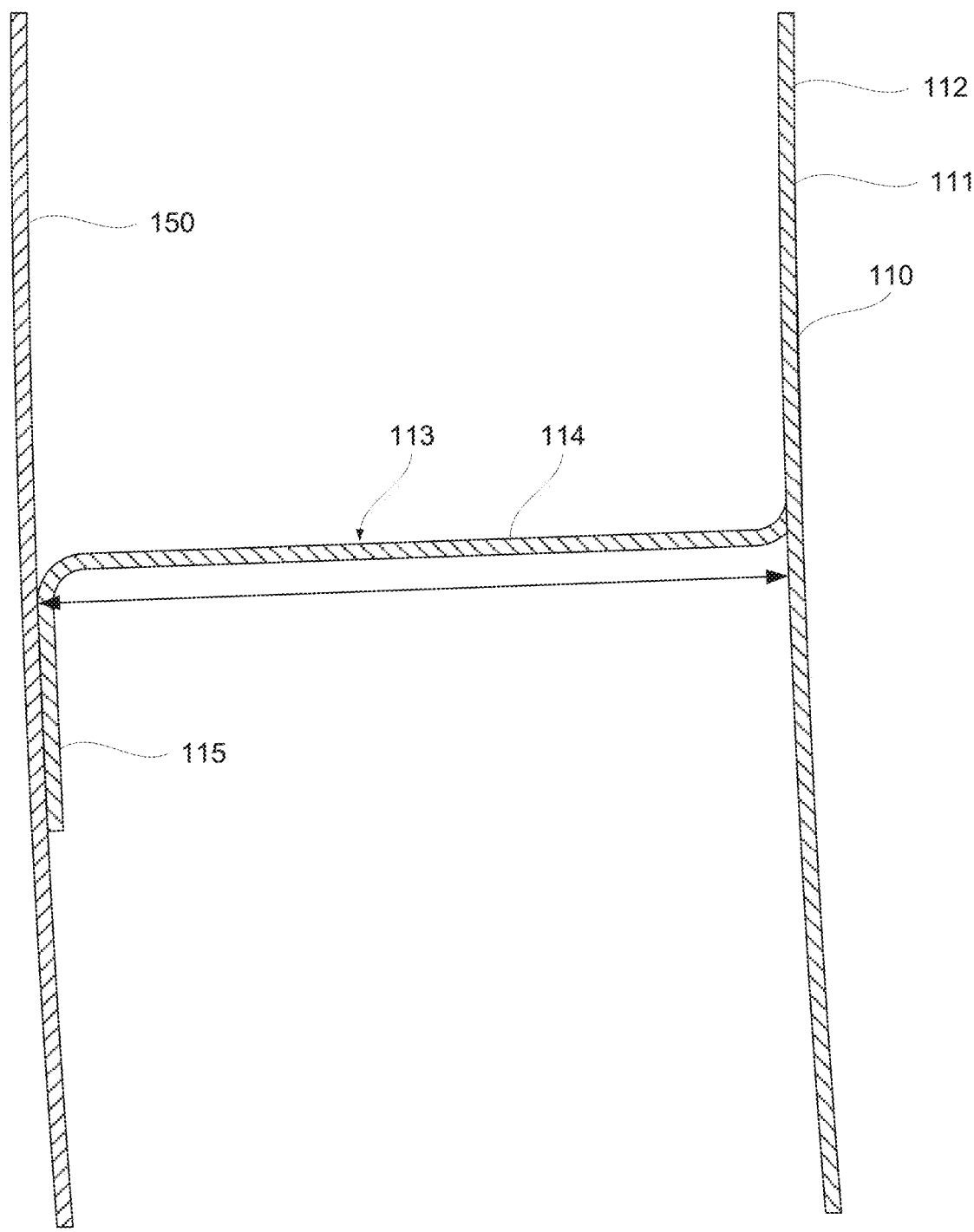
FIG. 3A is a schematic cross-sectional view of a portion of the composite door of FIG. 1, illustrating various features of a composite frame, according to one or more examples of the subject matter, disclosed herein.
Figure 3H:
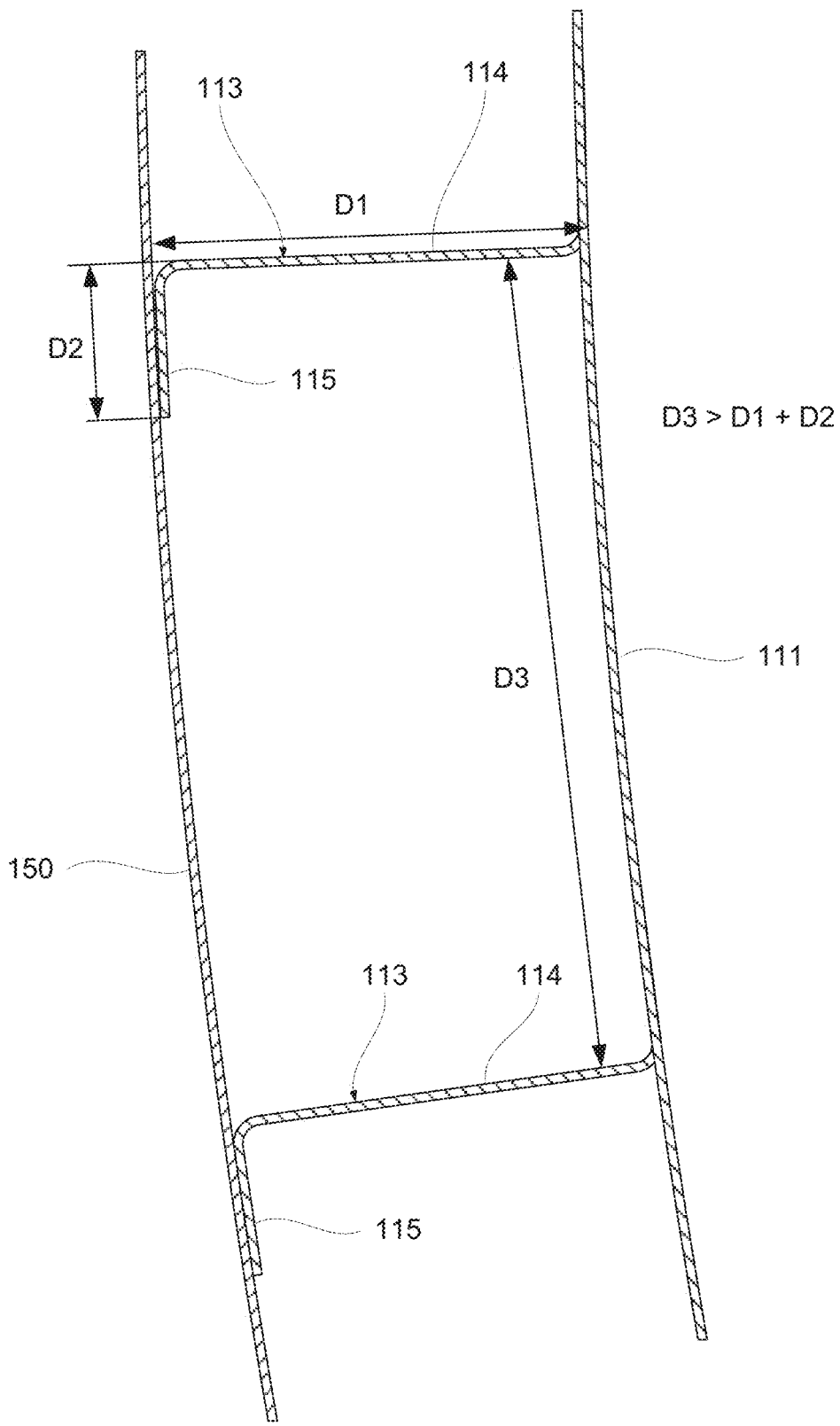
FIG. 3H is a schematic cross-sectional view of a portion of the composite door of FIG. 1, illustrating various dimensional features of a composite frame, according to one or more examples of the subject matter, disclosed herein.

Referring generally to FIG. 1 and particularly to, e.g., FIG. 3A for illustrative purposes only and not by way of limitation, crossbeams 113 of composite frame 110 comprise major portions 114, non-parallel to first rail 111 and to second rail 112 and extending to composite skin 150. The preceding portion of this paragraph characterizes example 5 of the subject matter, disclosed herein, where example 5 also encompasses any one of examples 1 to 4, above.

Major portions 114 provides spacing between each of first rail 111 and composite skin 150 and also between second rail 112 and composite skin 150, thereby improving the overall mechanical strength and load bearing capabilities of composite door 100. This spacing also corresponds to (e.g., determined by) the length of first-beam base 131 of first composite side beam 130, the length of second-beam base 141 of second composite side beam 140, the length of first end wall 125 of each of first composite edge fittings 120, and the length of second end wall 128 of each of second composite edge fittings 122. The length of major portions 114 determined the thickness of composite door 100. In some examples, each of major portions 114 extend substantially perpendicular (e.g., between 80° and 100°) relative to one or both first rail 111 (or second rail 112) and composite skin 150 as, for example, is schematically shown in FIG. 3A.

Referring generally to FIG. 1 and particularly to, e.g., FIG. 3A for illustrative purposes only and not by way of limitation, major portions 114 of crossbeams 113 extend between composite skin 150 and each of first rail 111 and second rail 112. The preceding portion of this paragraph characterizes example 6 of the subject matter, disclosed herein, where example 6 also encompasses example 5, above.

Major portions 114 provides spacing between each of first rail 111 and composite skin 150 and also between second rail 112 and composite skin 150, thereby improving the overall mechanical strength and load bearing capabilities of composite door 100. This spacing also corresponds to (e.g., determined by) the length of first-beam base 131 of first composite side beam 130, the length of second-beam base 141 of second composite side beam 140, the length of first end wall 125 of each of first composite edge fittings 120, and the length of second end wall 128 of each of second composite edge fittings 122. The length of major portions 114 determined the thickness of composite door 100. In some examples, each of major portions 114 extend substantially perpendicular (e.g., between 80° and 100°) relative to one or both first rail 111 (or second rail 112) and composite skin 150 as, for example, is schematically shown in FIG. 3A.

Referring generally to FIG. 1 and particularly to, e.g., FIG. 3A for illustrative purposes only and not by way of limitation, crossbeams 113 of composite frame 110 further comprise skin-support portions 115, each extending from and non-parallel to a corresponding one of major portions 114 of crossbeams 113. Each of skin-support portions 115 of crossbeams 113 is connected to composite skin 150. The preceding portion of this paragraph characterizes example 7 of the subject matter, disclosed herein, where example 7 also encompasses example 5 or 6, above.

Skin-support portions 115 provide an interface with composite skin 150 for attachment of composite skin 150 to composite frame 110 and provide support to composite skin 150, e.g., between first composite side beam 130 and second composite side beam 140. As a result of the aforementioned attachment and support, composite skin 150 can be made of a light-weight material, while being capable of carrying critical loads (e.g., pressure differentials across composite skin 150).

In some examples, each of skin-support portions 115 conforms to a corresponding portion of composite skin 150, thereby providing attachment interfaces between composite skin 150 and composite frame 110. Skin-support portions 1:15 extend between first composite side beam 130 and second composite side beam 140 or at least between first composite edge fittings 120 and second composite edge fittings 122.

Referring generally to FIG. 1 and particularly to, e.g., FIGS. 3A, 3C, 3D, 3F, and 3G for illustrative purposes only and not by way of limitation, each of skin-support portions 115 of crossbeams 113 extends from a corresponding one of major portions 114 of crossbeams 113 along composite skin 150. The preceding portion of this paragraph characterizes example 8 of the subject matter, disclosed herein, where example 8 also encompasses example 7, above.

Skin-support portions 115 provide an interface with composite skin 150 for attachment of composite skin 150 to composite frame 110 and provide support to composite skin 150, e.g., between first composite side beam 130 and second composite side beam 140. As a result of the aforementioned attachment and support, composite skin 150 can be made of a light-weight material, while being capable of carrying critical loads (e.g., pressure differentials across composite skin 150).

In some examples, each of skin-support portions 115 conforms to a corresponding portion of composite skin 150, thereby providing attachment interfaces between composite skin 150 and composite frame 110. Skin-support portions 115 extend between first composite side beam 130 and second composite side beam 140 or at least between first composite edge fittings 120 and second composite edge fittings 122.

Referring generally to FIG. 1 and particularly to, e.g., FIGS. 3B-3D for illustrative purposes only and not by way of limitation, skin-support portions 115 of crossbeams 113 comprise first skin-support portions 115a and second skin-support portions 115b. Each of first skin-support portions 115a of crossbeams 113 extends from a corresponding one of major portions 114 of crossbeams 113 in a first direction along composite skin 150. Each of second skin-support portions 115b of crossbeams 113 extends from a corresponding one of major portions 114 of crossbeams 113 in a second direction along composite skin 150, opposite of first direction. The preceding portion of this paragraph characterizes example 9 of the subject matter, disclosed herein, where example 9 also encompasses example 7 or 8, above.

First skin-support portions 115a and second skin-support portions 115b, extending in opposite directions, provides uniform load distribution support to composite skin 150. In other words, first skin-support portions 115a and second skin-support portions 115b provide symmetric support to composite skin 150 between first skin end 151 and second skin end 152. FIG. 3B illustrates composite door 100 comprising four first skin-support portions 115a extending toward first skin end 151 and four second skin-support portions 115b extending toward second skin end 152. In some examples, skin-support portions in each corresponding pair of first skin-support portions 115a and second skin-support portions 115b are equally spaced from the center of composite door 100.

Referring generally to FIG. 1 and particularly to, e.g., FIGS. 2E and 3A for illustrative purposes only and not by way of limitation, each of first rail 111 and second rail 112 is parallel to composite skin 150. The preceding portion of this paragraph characterizes example 10 of the subject matter, disclosed herein, where example 10 also encompasses any one of examples 1 to 9, above.

First rail 111 and second rail 112 being spaced from composite skin 150 forms a structural unibody of composite door 100, effectively forming a truss-like structure. Furthermore, when each of first rail 111 and second rail 112 is parallel to composite skin 150, composite door 100 has a uniform thickness, defined by this spacing. While each of first rail 111 and second rail 112 is parallel to composite skin 150, in some examples, these structures are curved in some examples, e.g., as shown in FIG. 2E.

Figure 2H:
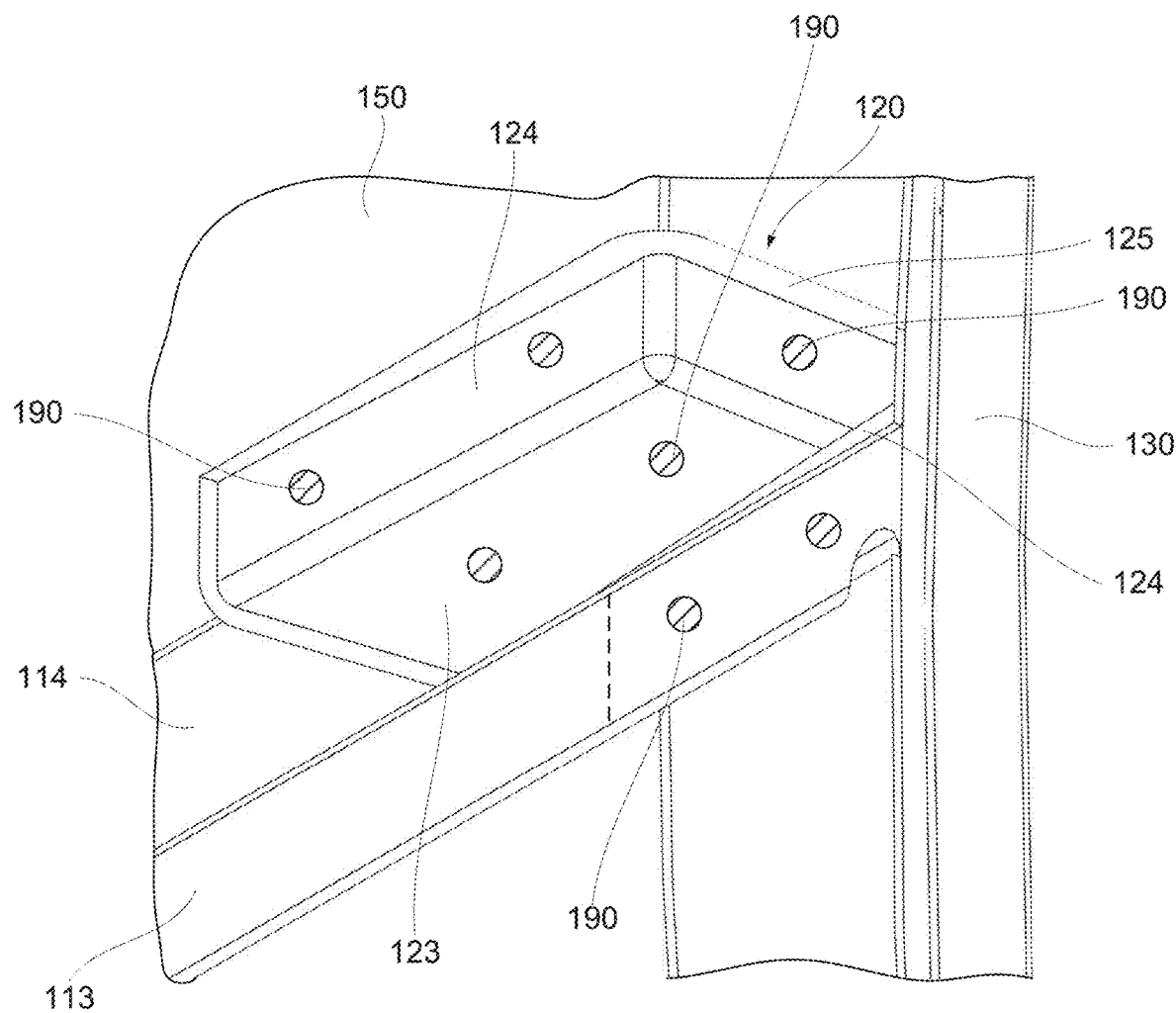
FIG. 2H is a schematic perspective view of a portion of the composite door of FIG. 1, illustrating one of first composite edge fittings, attached to a composite skin, to a cross-beam, and to a first composite side beam, according to one or more examples of the subject matter, disclosed herein.

Referring generally to FIG. 1 and particularly to, e.g., FIG. 2H for illustrative purposes only and not by way of limitation, each one of first composite edge fittings 120 comprises first base wall 123, two first side walls 124, and first end wall 125. Two first side walls 124 are interconnected by first base wall 123 and by first end wall 125. A first one of two first side walls 124 is connected to composite frame 110. The preceding portion of this paragraph characterizes example 11 of the subject matter, disclosed herein, where example 11 also encompasses any one of examples 1 to 4, above.

Multiple walls (e.g., first base wall 123, two first side walls 124, and first end wall 125) of first composite edge fittings 120 enable interconnection of multiple components of composite door 100. The connections, provided by first composite edge fittings 120, simplify the design and fabrication of other components of composite door 100.

In some examples, the first one of two first side walls 124 is connected to crossbeam 113 of composite frame 110 as, e.g., is shown in FIG. 2H. The connection can be formed by various means, such as adhesive, fasteners, and the like, as further described below.

Referring generally to FIG. 1 and particularly to, e.g., FIG. 2H for illustrative purposes only and not by way of limitation, a second one of two first side walls 124 of each one of first composite edge fittings 120 is connected to composite skin 150. The preceding portion of this paragraph characterizes example 12 of the subject matter, disclosed herein, where example 12 also encompasses example 11, above.

Multiple walls of first composite edge fittings 120 enable interconnection of multiple components of composite door 100, e.g., a combination of two first side walls 124 of first composite edge fittings 120 interconnects composite skin 150 and composite frame 110. Specifically, each one of first composite edge fittings 120 supports a corresponding portion of composite skin 150 relative to composite frame 110 thereby enhancing the strength of composite skin 150. The connections, provided by first composite edge fittings 120 simplify the design and fabrication of other components of composite door 100. The connection can be formed by various means, such as adhesive, fasteners, and the like, as further described below.

Referring generally to FIG. 1 and particularly to, e.g., FIG. 2H for illustrative purposes only and not by way of limitation, first end wall 125 of each one of first composite edge fittings 120 is connected to first composite side beam 130. The preceding portion of this paragraph characterizes example 13 of the subject matter, disclosed herein, where example 13 also encompasses any example 11 or 12, above.

Multiple walls of first composite edge fittings 120 enable interconnection of multiple components of composite door 100, e.g., a combination of one of two first side walls 124 and first end wall 125 of first composite edge fittings 120 interconnects first composite side beam 130 and composite frame 110. Specifically, each one of first composite edge fittings 120 supports corresponding portion of composite frame 110 and composite skin 150 relative to first composite side beam 130, thereby enhancing the strength of each one of these components at this connection interface. The connections, provided by first composite edge fittings 120, simplify the design and fabrication of other components of composite door 100. The connection can be formed by various means, such as adhesive, fasteners, and the like, as further described below.

Figure 2I:
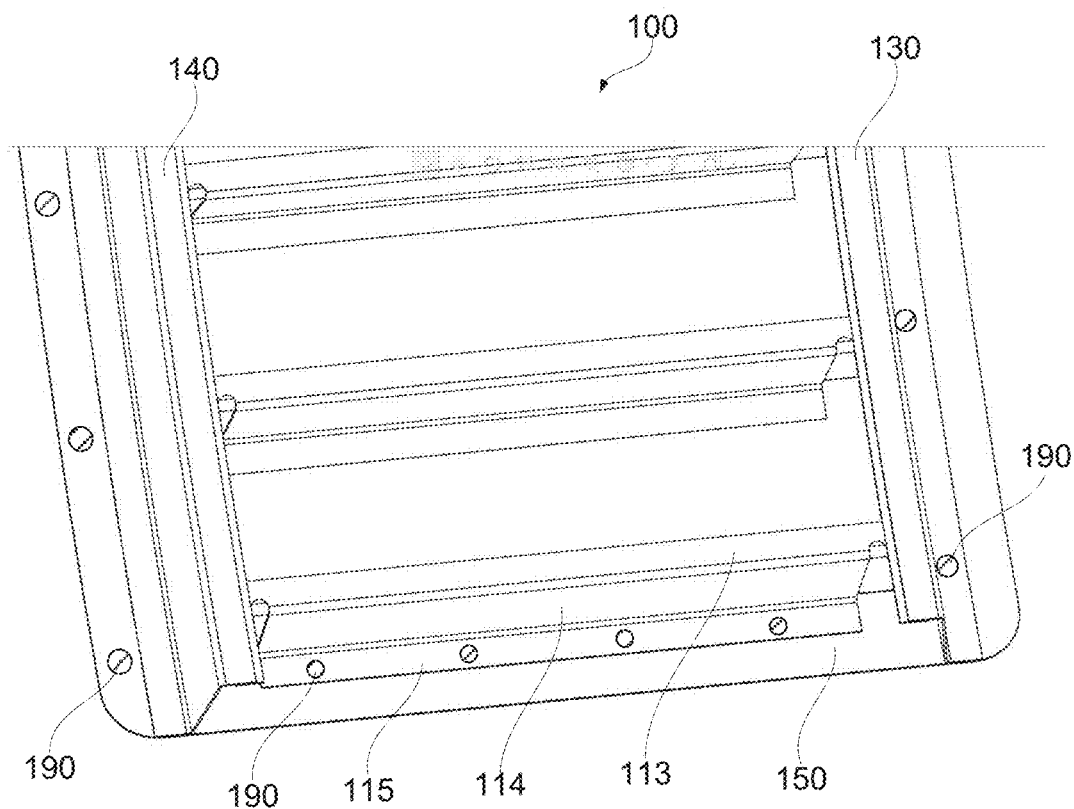
FIGS. 2I and 2J are schematic perspective views of portions of the composite door of FIG. 1, illustrating a composite skin, attached to a cross-beam, to a first composite side beam, and to a second composite side beam, according to one or more examples of the subject matter, disclosed herein.

Referring generally to FIG. 1 and particularly to, e.g., FIGS. 2H and 2I for illustrative purposes only and not by way of limitation, crossbeams 113 of composite frame 110 comprise major portions 114 and skin-support portions 115. Each of skin-support portions 115 of crossbeams 113 is connected to and is non-parallel to a corresponding one of major portions 114 of crossbeams 113. First base wall 123 of each of first composite edge fittings 120 is connected to a corresponding one of major portions 114 of crossbeams 113. The preceding portion of this paragraph characterizes example 14 of the subject matter, disclosed herein, where example 14 also encompasses any one of examples 11 to 13, above.

Different walls of first composite edge fittings 120 enable interconnection of multiple components of composite door 100, e.g., a combination of one of two first side walls 124 and first base wall 123 of first composite edge fittings 120 provides robust connections to composite frame 110, which is one of main structural components of composite door 100. Specifically, each one of first composite edge fittings 120 supports corresponding portion of composite frame 110, thereby enhancing the strength of each component of composite frame 110 (e.g., major portions 114). The connections, provided by first composite edge fittings 120, simplify the design and fabrication of other components of composite door 100. The connection can be formed by various means, such as adhesive, fasteners, and the like, as further described below.

Figure 2J:
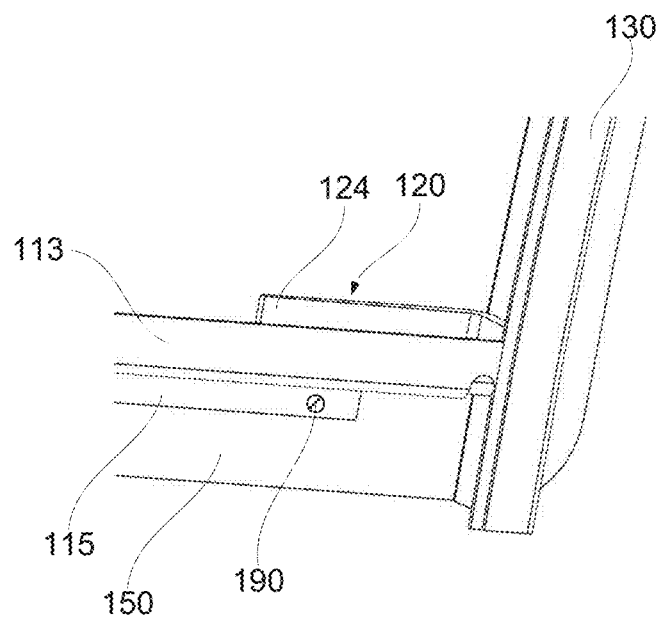

Referring generally to FIG. 1 and particularly to, e.g., FIGS. 2H-2J for illustrative purposes only and not by way of limitation, two first side walls 124 of each of first composite edge fittings 120 and a corresponding one of skin-support portions 115 of crossbeams 113 extend in opposite directions. The preceding portion of this paragraph characterizes example of the subject matter, disclosed herein, where example 15 also encompasses example 14, above.

One of two first side walls 124 of each of first composite edge fittings 120 is connected to composite skin 150 as, e.g., is shown in FIG. 2H. Similarly, each of skin-support portions 115 is connected to composite skin 150 as, e.g., is shown in FIGS. 2I and 2H. When two first side walls 124 of each of first composite edge fittings 120 and a corresponding one of skin-support portions 115 extend in opposite directions, composite skin 150 receives support, over a combined area, collectively provided by two first side walls 124 and skin-support portions 115. As such, a large portion of composite skin 150 is supported.

Referring generally to FIG. 1 and particularly to, e.g., FIGS. 2C and 2E for illustrative purposes only and not by way of limitation, composite skin 150 is curved. Each of first composite side beam 130 and second composite side beam 140 are geometrically complementary with composite skin 150. The preceding portion of this paragraph characterizes example 15 of the subject matter, disclosed herein, where example 16 also encompasses any one of examples 1 to 15, above.

Composite door 100 is used for various applications, such as aircraft. In some examples, shape of composite door 100 corresponds to shape of a surrounding structure, e.g., an aircraft fuselage. For example, the cross-section of a typical aircraft fuselage has curved contours. As a result, composite skin 150 is non-planar to form non-planar composite doors. First composite side beam 130 and second composite side beam 140 conform to composite skin 150 to ensure support along sides of composite door 100. In some examples, the curvature radius of composite skin 150 is continuous between first skin end 151 and second skin end 152. Alternatively, the curvature radius varies.

Referring generally to FIG. 1 and particularly to, e.g., FIGS. FIGS. 2C and 2E for illustrative purposes only and not by way of limitation, each of crossbeams 113 of composite frame 110 is geometrically complementary with composite skin 150. The preceding portion of this paragraph characterizes example 17 of the subject matter, disclosed herein, where example 17 also encompasses any one of examples 1 to 16, above.

Each of crossbeams 113 of composite frame 110 conforms to composite skin 150 to provide support to composite skin 150 between sides of composite door 100. This support enables composite skin 150 to be formed from lighter structures, thereby reducing the overall weight of composite door 100. In some examples, each of crossbeams 113 conforms to and contacts a corresponding portion of composite skin 150. For example, crossbeams 113 comprise skin-support portions 115 that conform to and contact composite skin 150.

Referring generally to FIG. 1 and particularly to, e.g., FIGS. 2I and 2H for illustrative purposes only and not by way of limitation, composite skin 150 is connected, using fasteners 190, to each of crossbeams 113 of composite frame 110, to first composite side beam 130, and to second composite side beam 140. The preceding portion of this paragraph characterizes example 18 of the subject matter, disclosed herein, where example 18 also encompasses any one of examples 1 to 17, above.

Fasteners 190 are used to interconnect various components of composite door 100 and to ensure load transfer between these components, such as between composite skin 150 and crossbeams 113, between composite skin 150 and first composite side beam 130, and between composite skin 150 and second composite side beam 140. Furthermore, fasteners 190 enable interconnection of components, made from different types of materials, e.g., composites and metals. Some examples of fasteners 190 include, but are not limited to, rivets, bolt-nut assemblies, and the like. Fasteners 190 are installed during fabrication of composite door 100.

Referring generally to FIG. 1 and particularly to, e.g., FIG. 2H for illustrative purposes only and not by way of limitation, each of first composite edge fittings 120 is connected, using first set of fasteners 190, to corresponding one of crossbeams 113 of composite frame 110, to first composite side beam 130, and to composite skin 150. Each of second composite edge fittings 122 is connected, using a second set of fasteners 190, to corresponding one of crossbeams 113 of composite frame 110, to second composite side beam 140, and to composite skin 150. The preceding portion of this paragraph characterizes example 19 of the subject matter, disclosed herein, where example 19 also encompasses example 18, above.

First composite edge fittings 120 and second composite edge fittings 122, together with fasteners 190, interconnect various components of composite door 100 and ensure load transfer between these components, such as between each of first composite edge fittings 120 and crossbeams 113, each of first composite edge fittings 120 and first composite side beam 130, as well as each of first composite edge fittings 120 and composite skin 150. Furthermore, fasteners 190 enable interconnection of components, made from different types of materials, e.g., composites and metals. Some examples of fasteners 190 include, but are not limited to, rivets, bolt-nut assemblies, and the like. Fasteners 190 are installed during fabrication of composite door 100.

Figure 2K:
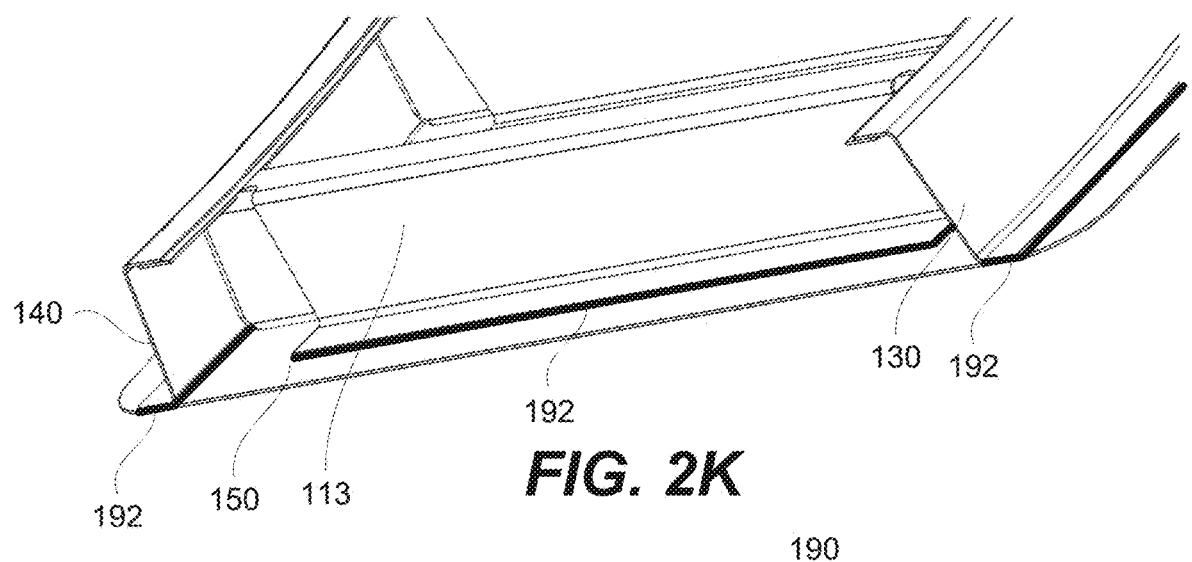
FIG. 2K is a schematic cross-sectional view of a portion of the composite door of FIG. 1, illustrating a composite skin, connected to a crossbeam as well as to a first composite side beam and to a second composite side beam using adhesive, according to one or more examples of the subject matter, disclosed herein.

Referring generally to FIG. 1 and particularly to, e.g., FIG. 2K for illustrative purposes only and not by way of limitation, composite skin 150 is connected, using adhesive 192, to each of crossbeams 113 of composite frame 110, to first composite side beam 130, and to second composite side beam 140. The preceding portion of this paragraph characterizes example 20 of the subject matter, disclosed herein, where example 20 also encompasses any one of examples 1 to 19, above.

Adhesive 192 enables interconnection of various components of composite door 100 and ensures load transfer between these components without the need to form holes or other features in these components. Furthermore, the weight of adhesive 192 is generally less than that of other types of fasteners, which is important for various applications, such as aircraft. Referring to FIG. 2K, adhesive 192 is disposed between composite skin 150 and each of crossbeams 113 and connects composite skin 150 and each of crossbeams 113. Adhesive 192 is also disposed between composite skin 150 and first composite side beam 130, e.g., along the entire length of first composite side beam 130. Furthermore, adhesive 192 is disposed between composite skin 150 and second composite side beam 140, e.g., along the entire length of second composite side beam 140.

Figure 2L:
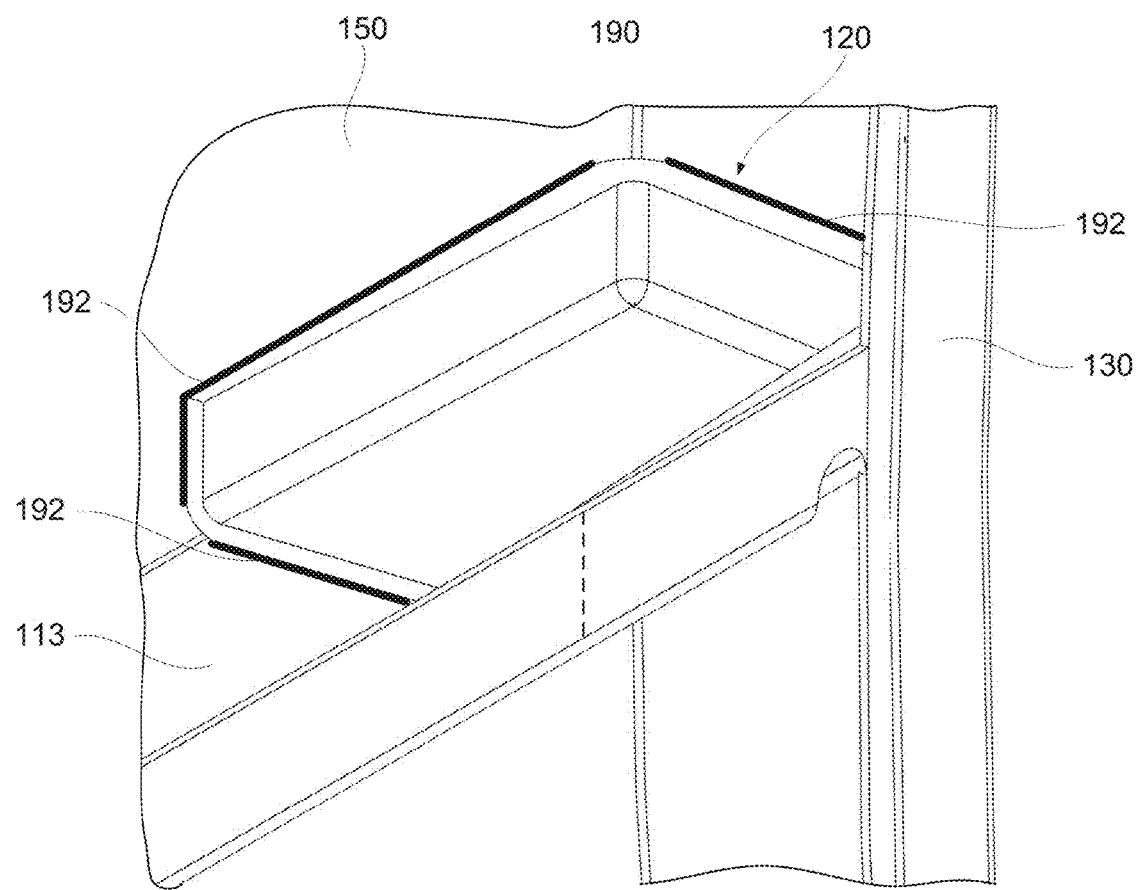
FIG. 2L is a schematic cross-sectional view of a portion of the composite door of FIG. 1, illustrating each of first composite edge fittings connected to a corresponding one of crossbeams, to a first composite side beam, and to a composite skin using a first quantity of adhesive, according to one or more examples of the subject matter, disclosed herein.
Figure 2M:
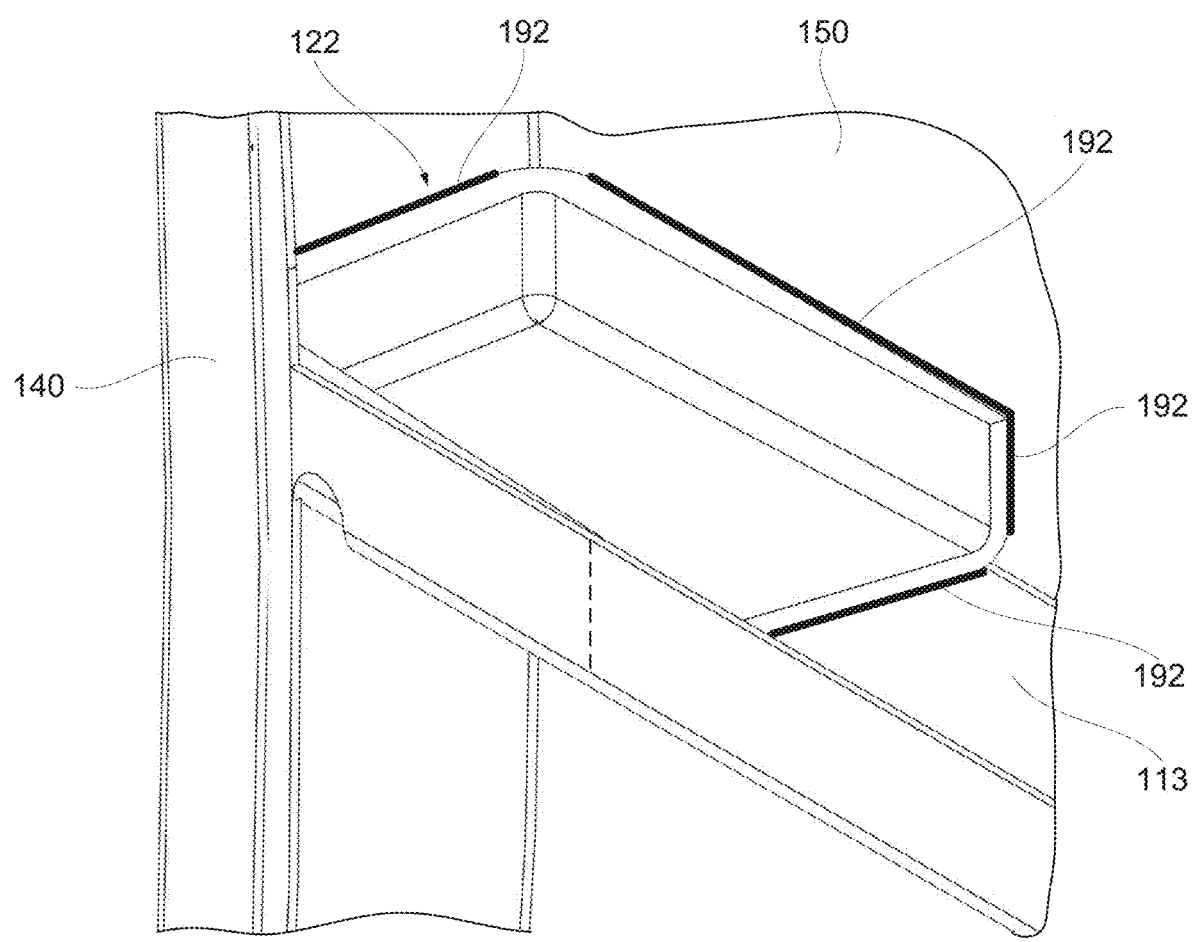
FIG. 2M is a schematic cross-sectional view of a portion of the composite door of FIG. 1, illustrating each of second composite edge fittings connected to a corresponding one of crossbeams, to a second composite side beam, and to a composite skin using a second quantity of adhesive, according to one or more examples of the subject matter, disclosed herein.

Referring generally to FIG. 1 and particularly to, e.g., FIGS. 2L and 2M for illustrative purposes only and not by way of limitation, each of first composite edge fittings 120 is connected, using a first quantity of adhesive 192, to corresponding one of crossbeams 113 of composite frame 110, to first composite side beam 130, and to composite skin 150. Each of second composite edge fittings 122 is connected, using a second quantity of adhesive 192, to corresponding one of crossbeams 113 of composite frame 110, to second composite side beam 140, and to composite skin 150. The preceding portion of this paragraph characterizes example 21 of the subject matter, disclosed herein, where example 21 also encompasses example 20, above.

Adhesive 192 enables interconnection of various components of composite door 100 and ensures load transfer between these components without the need to form holes or other features. Furthermore, the weight of adhesive 192 is generally less than that of other types of fasteners, which is important for various applications, such as aerospace. First composite edge fittings 120 and second composite edge fittings 122, together with adhesive 192, interconnect various components of composite door 100 and ensure load transfer between these components Referring to FIG. 2L, the first quantity of adhesive 192 is disposed between each of first composite edge fittings 120 and corresponding one of crossbeams 113 of composite frame 110 and connects this fitting to the corresponding crossbeam. The first quantity of adhesive 192 is also disposed between each of first composite edge fittings 120 and first composite side beam 130 and connects this fitting to first composite side beam 130. Finally, the first quantity of adhesive 192 is also disposed between each of first composite edge fittings 120 and composite skin 150 and connects this fitting to composite skin 150.

Referring to FIG. 2M, the second quantity of adhesive 192 is disposed between each of second composite edge fittings 122 and corresponding one of crossbeams 113 of composite frame 110 and connects this fitting to the corresponding crossbeam. The second quantity of adhesive 192 is also disposed between each of second composite edge fittings 122 and second composite side beam 140 and connects this fitting to second composite side beam 140. Finally, the second quantity of adhesive 192 is also disposed between each of second composite edge fittings 122 and composite skin 150 and connects this fitting to composite skin 150.

Referring generally to FIG. 1 and particularly to, e.g., FIGS. 4A-4E for illustrative purposes only and not by way of limitation, composite door 100 further comprises stop fittings 180, connected to first composite side beam 130 and to second composite side beam 140. The preceding portion of this paragraph characterizes example 22 of the subject matter, disclosed herein, where example 22 also encompasses any one of examples 1 to 21, above.

Stop fittings 180 are used for attaching composite door 100 to another component, e.g., an aircraft fuselage. Stop fittings 180 are configured to support composite door 100 relative to such component. Stop fittings 180 are also configured to interlock or otherwise attach to corresponding fittings on such component.

Figures 4A, 4B, 4C:
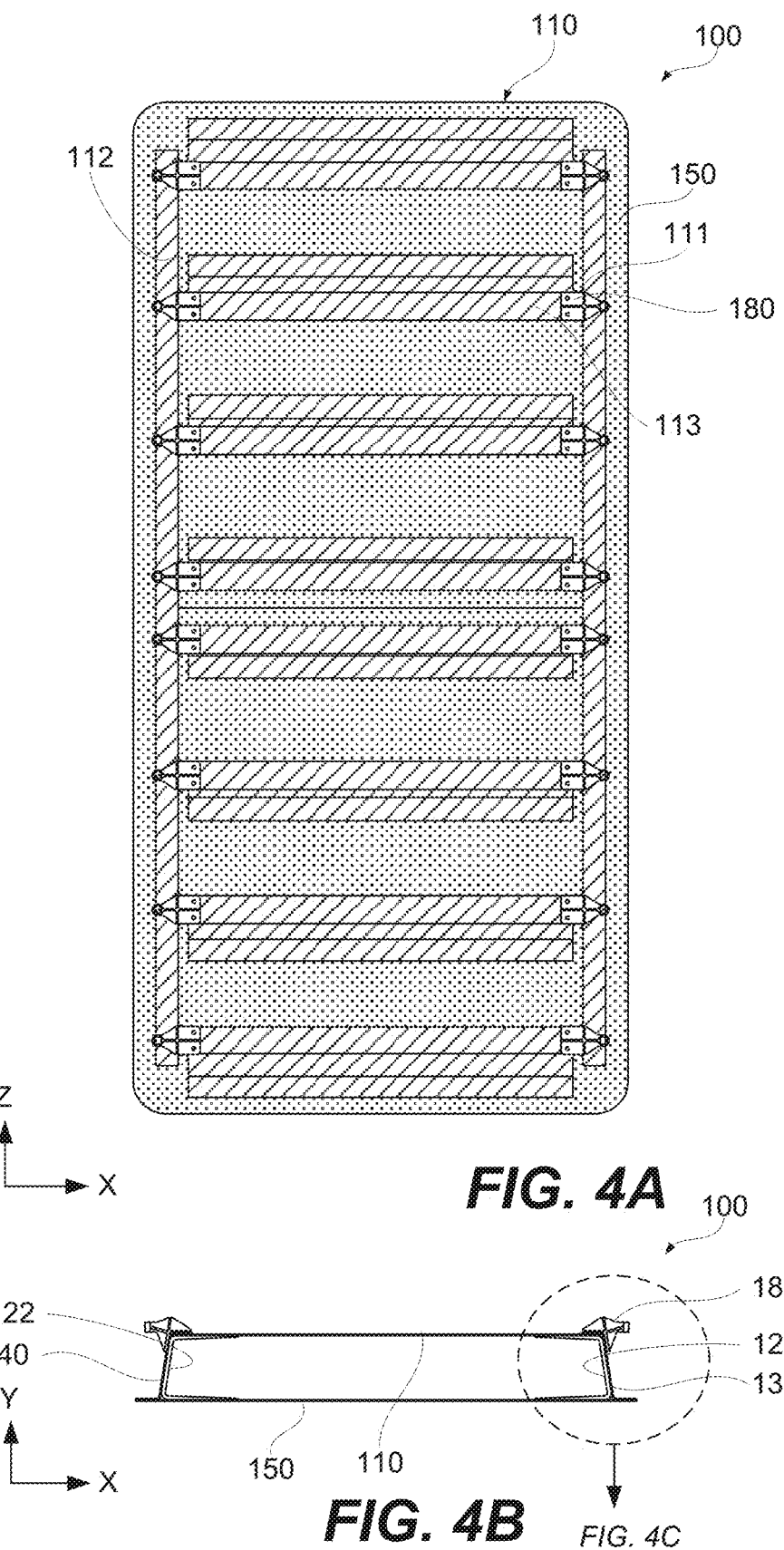
FIG. 4A is a schematic top view of the composite door of FIG. 1, showing stop fittings, according to one or more examples of the subject matter, disclosed herein.
FIG. 4B is a schematic cross-sectional view of the composite door of FIG. 1, showing stop fittings, according to one or more examples of the subject matter, disclosed herein.
FIG. 4C is a schematic cross-sectional view of a portion the composite door of FIG. 1, showing a stop fitting, interfacing other components of the composite door, according to one or more examples of the subject matter, disclosed herein.

Referring generally to FIG. 1 and particularly to, e.g., FIG. 4A for illustrative purposes only and not by way of limitation, each of stop fittings 180 is aligned with and positioned over a corresponding one of crossbeams 113 of composite frame 110. The preceding portion of this paragraph characterizes example 23 of the subject matter, disclosed herein, where example 23 also encompasses example 22, above.

Stop fittings 180 attaches composite door 100 an external component, e.g., an aircraft fuselage, and transfers loads between composite door 100 and such external component. Crossbeams 113 are aligned with stop fittings 180 to assist with this load transfer and to redistribute the load within composite door 100. In some examples, stop fittings 180 are indirectly or directly attached to crossbeams 113. In the same examples, stop fittings 180 are indirectly or directly attached to other components of composite door 100, such as first composite edge fittings 120, second composite edge fittings 122, first composite side beam 130, and/or second composite side beam 140.

Referring generally to FIG. 1 and particularly to, e.g., FIGS. 4B and 4C for illustrative purposes only and not by way of limitation, each of stop fittings 180 is aligned with and positioned over a corresponding one of first composite edge fittings 120 or a corresponding one of second composite edge fittings 122. The preceding portion of this paragraph characterizes example 24 of the subject matter, disclosed herein, where example 24 also encompasses example 22 or 23, above.

Stop fittings 180 attaches composite door 100 an external component, e.g., an aircraft fuselage, and transfers loads between composite door 100 and such external component. First composite edge fittings 120 and second composite edge fittings 122 are aligned with stop fittings 180 to assist with this load transfer and to redistribute the load within composite door 100.

In some examples, stop fittings 180 are indirectly or directly attached to first composite edge fittings 120 and second composite edge fittings 122. Referring to FIG. 4C, in some examples, a portion of first composite side beam 130 and/or a portion of composite frame 110 is positioned between first composite edge fittings 120 and at least a first set of stop fittings 180. In a similar manner, in some examples, a portion of second composite side beam 140 and/or a portion of composite frame 110 is positioned between second composite edge fittings 122 and at least a second set of stop fittings 180.

Figure 5:
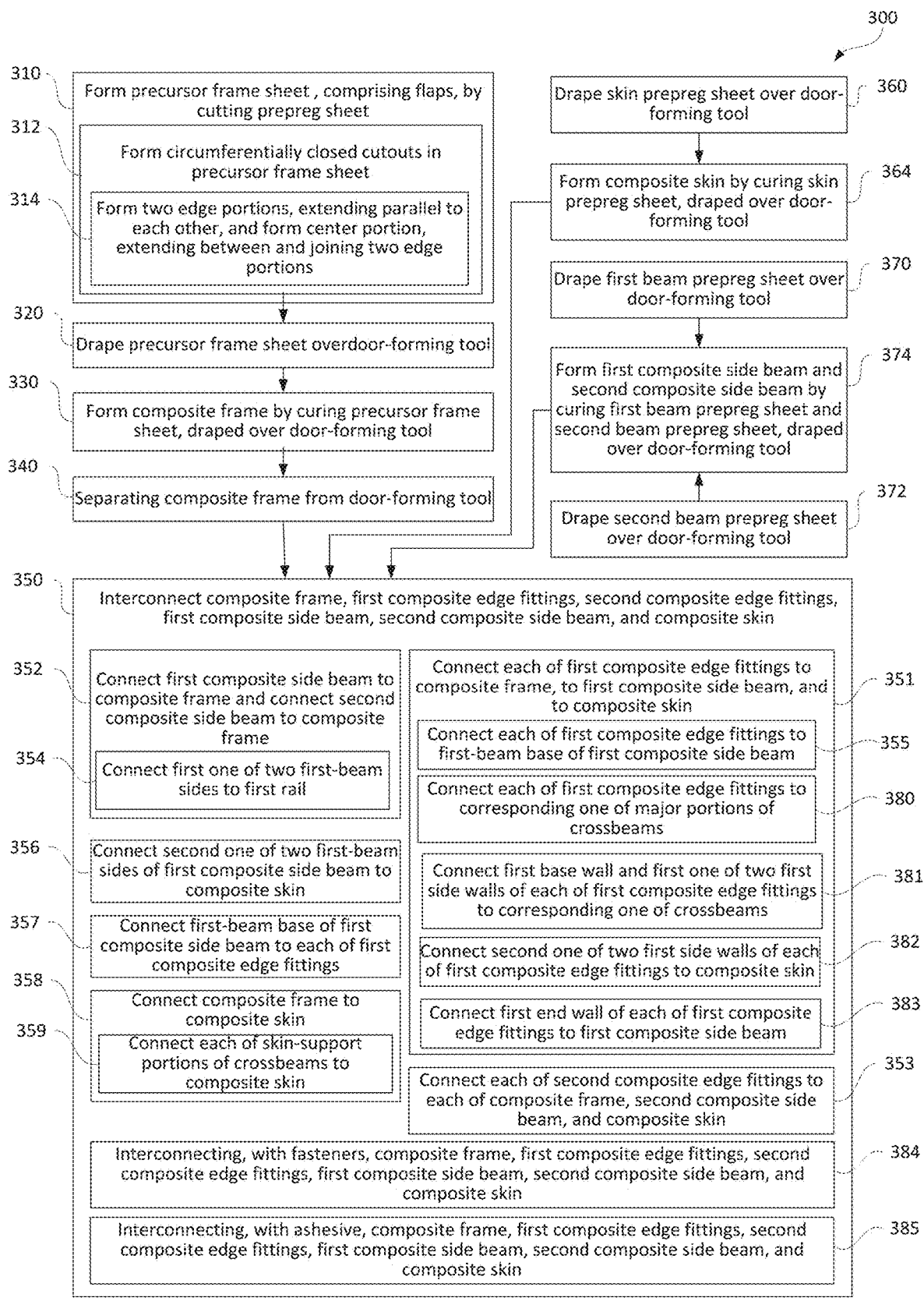
FIG. 5 is a block diagram of a method, according to one or more examples of the subject matter, disclosed herein, of forming the composite door of FIG. 1, according to one or more examples of the subject matter, disclosed herein.

Referring generally to FIG. 5 and particularly to, e.g., FIGS. 2-7 for illustrative purposes only and not by way of limitation, method 300 of forming composite door 100 is disclosed. Method 300 comprises (block 310) forming precursor frame sheet 410, which comprises flaps 411, by cutting prepreg sheet 400. Method 300 also comprises (block 320) draping precursor frame sheet 410 over door-forming tool 500, which comprises frame face 510 and flap supports 512, non-parallel to frame face 510, such that each of flaps 411 of precursor frame sheet 410 is geometrically complementary with a corresponding one of flap supports 512. Method 300 further comprises (block 330) forming composite frame 110 by curing precursor frame sheet 410, draped over door-forming tool 500, (block 340) separating composite frame 110 from door-forming tool 500, and (block 350) interconnecting composite frame 110, first composite edge fittings 120, second composite edge fittings 122, first composite side beam 130, second composite side beam 140, and composite skin 150. The preceding portion of this paragraph characterizes example 25 of the subject matter, disclosed herein.

Various components of composite door 100 are formed from prepreg sheets, which provide precise control over material consistency than, e.g., composite layups. For example, composite frame 110 is formed from prepreg sheet 400, which is cut and formed into the shape of composite frame 110. Furthermore, these prepreg sheets enable integration of different features, such as different components of composite frame 110. Composite door 100 is lighter that conventional door, such as metal doors or, more specifically, aluminum doors. Composite door 100 has a lower risk of environmental deterioration (e.g., corrosion) in comparison to conventional metal doors. Furthermore, composite door 100 has fewer parts, such as composite frame 110, first composite side beam 130, second composite side beam 140, and composite skin 150.

Cutting prepreg sheet 400 forms precursor frame sheet 410, comprising flaps 411. Precursor frame sheet 410 is then used to form composite frame 110, where flaps 411 correspond to crossbeams 113 of composite frame 110. Specifically, precursor frame sheet 410 is then draped over door-forming tool 500, which defines the shape of composite frame 110. For example, door-forming tool 500 comprises frame face 510 and flap supports 512, non-parallel to frame face 510. After draping, each of flaps 411 of precursor frame sheet 410 conforms to and is geometrically complementary with a corresponding one of flap supports 512. The shape of flap supports 512 corresponds to the shape of crossbeams 113.

Method 300 proceeds with curing precursor frame sheet 410, draped over door-forming tool 500, which forms composite frame 110. In some examples, other components of composite door 100 are cured at the same time and while also draped over door-forming tool 500, e.g., different portions of door-forming tool 500. The curing parameters are selected based on the properties (e.g., composition) of prepreg sheet 400.

The interconnecting composite frame 110, first composite edge fittings 120, second composite edge fittings 122, first composite side beam 130, second composite side beam 140, and composite skin 150 forms composite door 100. First composite side beam 130 and second composite side beam 140 extend along the height of composite door 100, e.g., between first skin end 151 and second skin end 152 of composite skin 150. In some examples, first composite side beam 130 and second composite side beam 140 extend parallel to each other. First composite side beam 130 and second composite side beam 140 provide support to composite skin 150 along edges of composite skin 150. In some examples, first composite side beam 130 and second composite side beam 140 have the same shape and are replaceable. For example, the curvature radius of first composite side beam 130 and second composite side beam 140 is continuous.

First composite edge fittings 120 interconnect a corresponding one of crossbeams 113 of composite frame 110, first composite side beam 130, and composite skin 150. Similarly, second composite edge fittings 122 interconnect a corresponding one of crossbeams 113, second composite side beam 140, and composite skin 150. Addition of first composite edge fittings 120 and second composite edge fittings 122 simplifies the design of composite frame 110, while providing robust connections between composite frame 110, first composite side beam 130, and composite skin 150. For example, each first composite edge fittings 120 and second composite edge fittings 122 comprising multiple sides designed to connect to various components of composite door 100 as further described below.

Figure 6A:
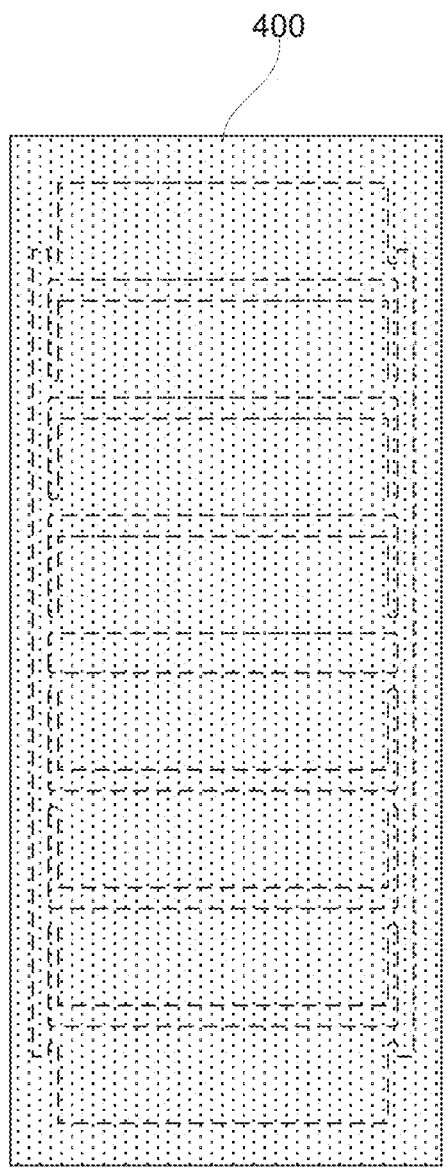
FIG. 6A is a top schematic view of a prepreg sheet, used for forming the composite door of FIG. 1, according to one or more examples of the subject matter, disclosed herein.
Figure 6B:
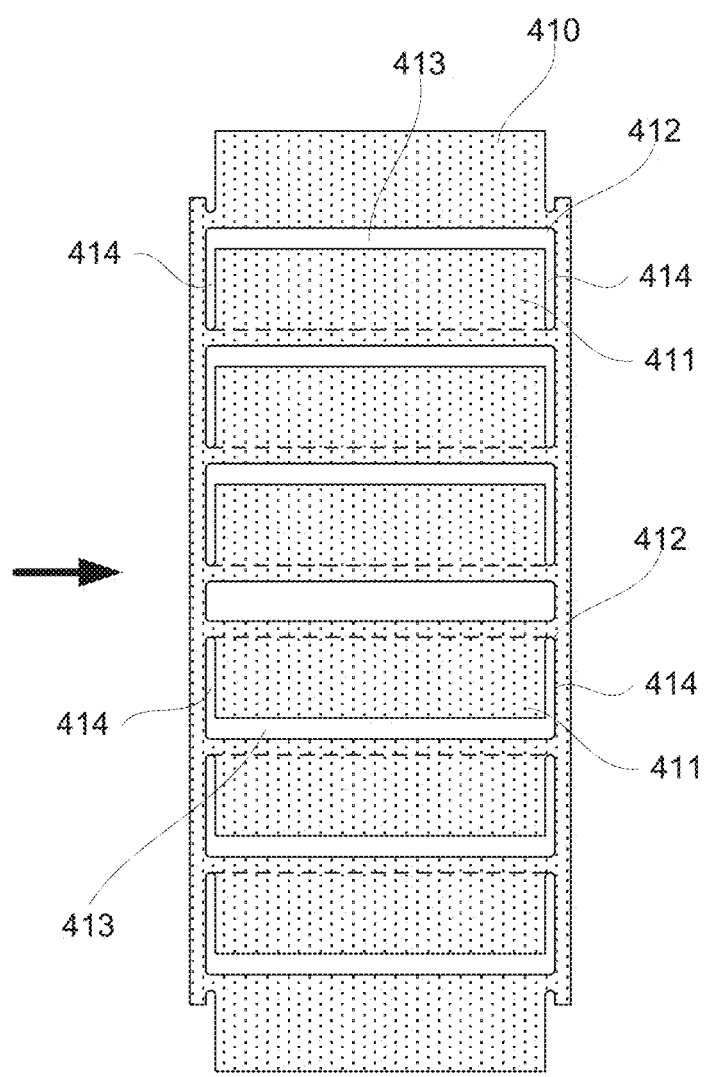
FIG. 6B is a top schematic view of a precursor frame sheet, formed from the prepreg sheet of FIG. 6A, used for forming the composite door of FIG. 1, according to one or more examples of the subject matter, disclosed herein.
Figure 6C:
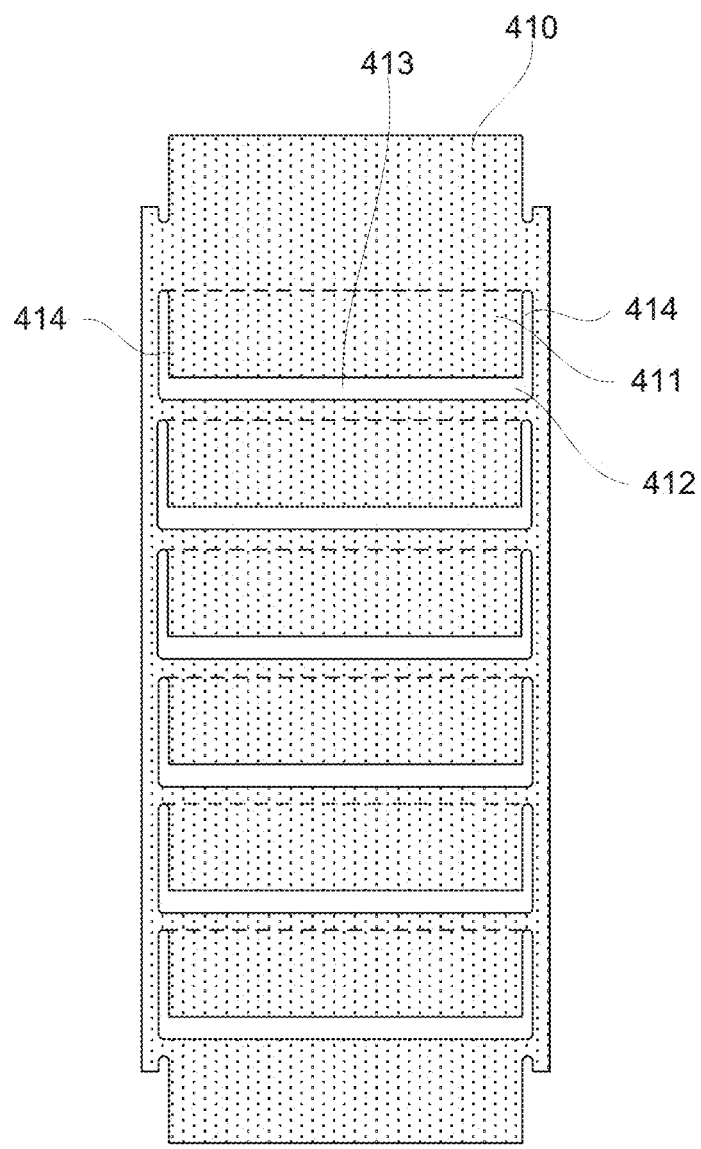
FIG. 6C is a top schematic view a precursor frame sheet, formed from the prepreg sheet of FIG. 6A, used for forming the composite door of FIG. 1, according to one or more examples of the subject matter, disclosed herein.

Referring generally to FIG. 5 and particularly to, e.g., FIGS. 6A-6C for illustrative purposes only and not by way of limitation, according to method 300, (block 310) forming precursor frame sheet 410 comprises (block 312) forming circumferentially closed cutouts 412 in precursor frame sheet 410. Each of flaps 411 is defined by a corresponding one of circumferentially closed cutouts 412. The preceding portion of this paragraph characterizes example 26 of the subject matter, disclosed herein, where example 26 also encompasses example 25, above.

Flaps 411 are directly integrated to rest of precursor frame sheet 410, while partial separation from the rest of precursor frame sheet 410 is provided by circumferentially closed cutouts 412. The direct integration eliminates the need for a separate attachment, resulting in a lighter overall assembly. Precursor frame sheet 410 is used to form composite frame 110. Each of flaps 411 of precursor frame sheet 410 is formed into crossbeams 113 of composite frame 110. Circumferentially closed cutouts 412 separate flaps 411 from parts of precursor frame sheet 410, which are later formed into first rail 111 and second rail 112 of composite frame 110.

Referring generally to FIG. 5 and particularly to, e.g., FIGS. 6B and 6C for illustrative purposes only and not by way of limitation, according to method 300, (block 312) forming circumferentially closed cutouts 412 comprises (block 314) forming two edge portions 414, extending parallel to each other, and forming center portion 413, extending between and joining two edge portions 414. The preceding portion of this paragraph characterizes example 27 of the subject matter, disclosed herein, where example 27 also encompasses example 26, above.

The shape of circumferentially closed cutouts 412 defines the shape of flaps 411, which are later formed into crossbeams 113 of composite frame 110. The shape of circumferentially closed cutouts 412 also defines the shape of other components of composite frame 110, corresponding to flaps 411. Center portion 413 defined the edge of each of flaps 411. Two edge portions 414 separate flaps 411 from the sides portions of precursor frame sheet 410, which are later formed into first rail 111 and second rail 112. In some examples, all parts of circumferentially closed cutouts 412 are formed in the same operation, e.g., cutting of prepreg sheet 400.

Referring generally to FIG. 5 and particularly to, e.g., FIGS. 7A-7E for illustrative purposes only and not by way of limitation, according to method 300, door-forming tool 500 comprises skin face 520. Method 300 further comprises (block 360) draping skin prepreg sheet 420 over door-forming tool 500, such that skin prepreg sheet 420 is geometrically complementary with skin face 520. Method 300 also comprises (block 364) forming composite skin 150 by curing skin prepreg sheet 420, draped over door-forming tool 500. The preceding portion of this paragraph characterizes example 28 of the subject matter, disclosed herein, where example 28 also encompasses any one of examples 25 to 27, above.

Door-forming tool 500 is used to form multiple components of composite door 100, such as both of composite skin 150 and composite frame 110, eliminating the need for multiple tools. Specifically, skin prepreg sheet 420 is used to form composite skin 150, while precursor frame sheet 410 is used to form composite frame 110. While draping skin prepreg sheet 420 over door-forming tool 500, skin prepreg sheet 420 conforms door-forming tool 500 or, more specifically, skin face 520. Skin face 520 has the same shape as composite skin 150.

Referring generally to FIG. 5 and particularly to, e.g., FIGS. 7A-7E for illustrative purposes only and not by way of limitation, according to method 300, (block 360) draping skin prepreg sheet 420 over door-forming tool 500 is performed while precursor frame sheet 410 is already draped over door-forming tool 500. The preceding portion of this paragraph characterizes example 29 of the subject matter, disclosed herein, where example 29 also encompasses example 28, above.

Door-forming tool 500 is used to form multiple components of composite door 100, such as both of composite skin 150 and composite frame 110, eliminating the need for multiple tools. Specifically, skin prepreg sheet 420 is used to form composite skin 150, while precursor frame sheet 410 is used to form composite frame 110. In some examples, these multiple components are formed at the same time on door-forming tool 500.

Referring generally to FIG. 5 and particularly to, e.g., FIGS. 7A-7E for illustrative purposes only and not by way of limitation, according to method 300, (block 364) forming composite skin 150 and (block 330) forming composite frame 110 are performed simultaneously. The preceding portion of this paragraph characterizes example 30 of the subject matter, disclosed herein, where example 30 also encompasses example 28 or 29, above.

Door-forming tool 500 is used to form multiple components of composite door 100, such as both of composite skin 150 and composite frame 110, at the same time. First, this simultaneous processing reduces the overall processing time, needed to form all components of composite door 100. Second, this simultaneous processing eliminates the need for multiple tools. Specifically, skin prepreg sheet 420 is used to form composite skin 150, while precursor frame sheet 410 is used to form composite frame 110. In some examples, the same processing conditions (e.g., curing temperature and duration) are used for composite skin 150 and forming composite frame 110.

Figure 7A:
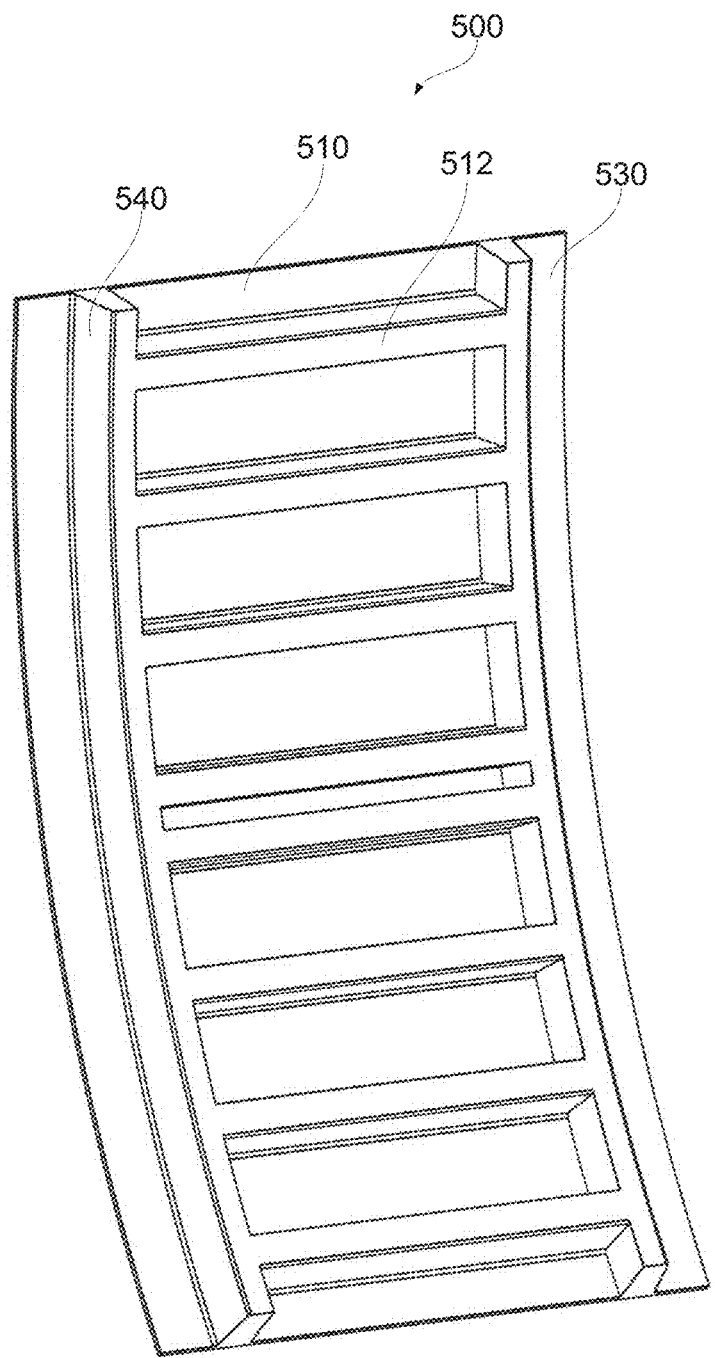
FIG. 7A is a perspective schematic view of a door-forming tool, used for forming the composite door of FIG. 1, according to one or more examples of the subject matter, disclosed herein.
Figure 7B:
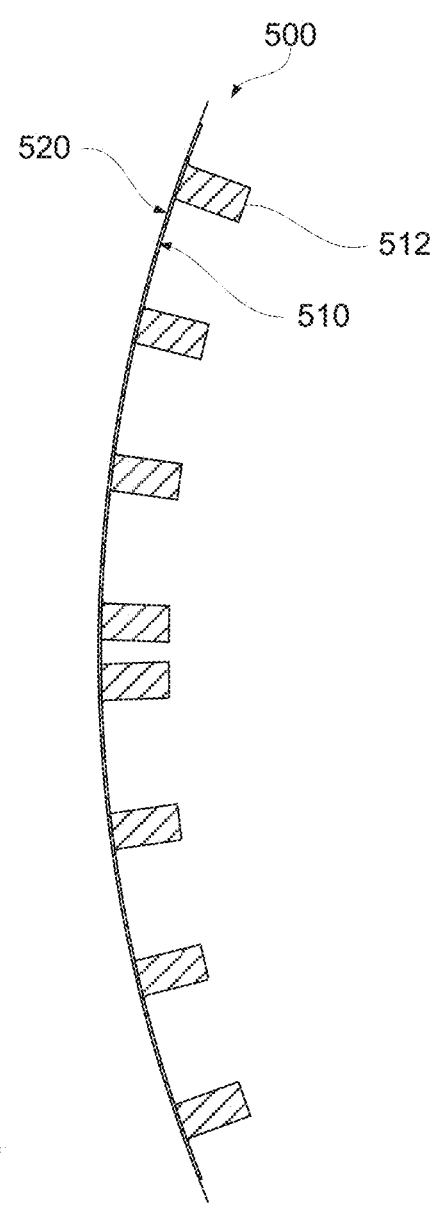
FIG. 7B is a cross-sectional side schematic view of the door-forming tool of FIG. 7A, used for forming the composite door of FIG. 1, according to one or more examples of the subject matter, disclosed herein.
Figures 7C, 7D:
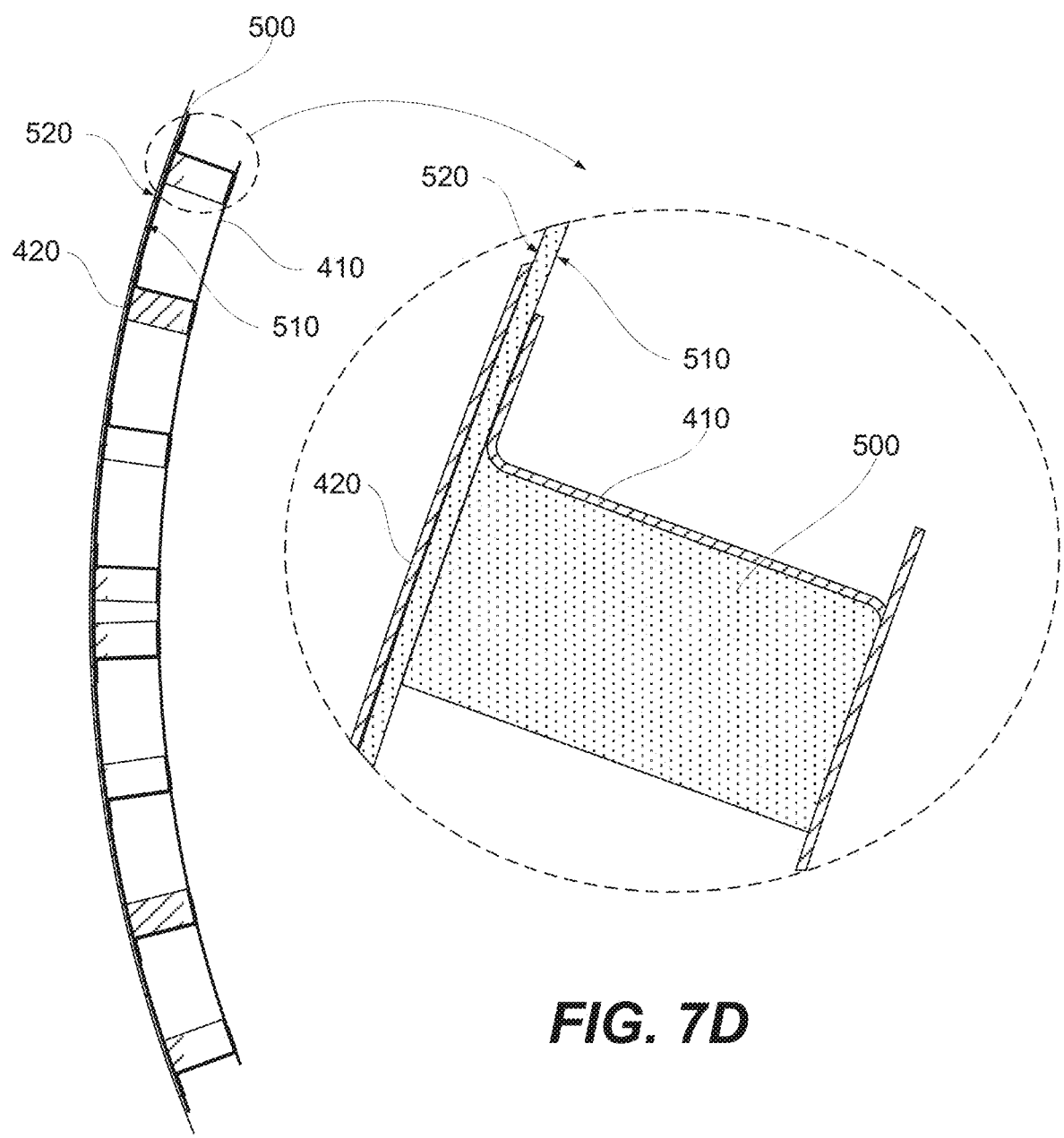
FIGS. 7C and 7D are cross-sectional side schematic views of the door-forming tool of FIG. 7A, illustrating a precursor frame sheet and a skin prepreg sheet, processed using the door-forming tool, used for forming the composite door of FIG. 1, according to one or more examples of the subject matter, disclosed herein.

Referring generally to FIG. 5 and particularly to, e.g., FIGS. 7A, 7E, and 7F for illustrative purposes only and not by way of limitation, according to method 300, door-forming tool 500 comprises first beam face 530 and second beam face 540. Method 300 further comprises (block 370) draping first beam prepreg sheet 430 over door-forming tool 500, such that first beam prepreg sheet 430 is geometrically complementary with first beam face 530. Method 300 also comprises (block 372) draping second beam prepreg sheet 440 over door-forming tool 500, such that second beam prepreg sheet 440 is geometrically complementary with second beam face 540, and (block 374) forming first composite side beam 130 and second composite side beam 140 by curing first beam prepreg sheet 430 and second beam prepreg sheet 440, draped over door-forming tool 500. The preceding portion of this paragraph characterizes example 31 of the subject matter, disclosed herein, where example 31 also encompasses any one of examples 28 to 30, above.

Door-forming tool 500 is used to form multiple components of composite door 100, such as composite skin 150, first composite side beam 130, and second composite side beam 140. First, this simultaneous processing reduces the overall processing time, needed to form all components of composite door 100. Second, this simultaneous processing eliminates the need for multiple tools. Specifically, skin prepreg sheet 420 is used to form composite skin 150, first beam prepreg sheet 430 is used to form first composite side beam 130, and second beam prepreg sheet 440 is used to form second composite side beam 140.

When first beam prepreg sheet 430 is draped over door-forming tool 500, first beam prepreg sheet 430 conforms to first beam face 530 as, e.g., is schematically shown in FIG. 7E. Likewise, when second beam prepreg sheet 440 is draped over door-forming tool 500, second beam prepreg sheet 440 conforms to second beam face 540 as, e.g., is schematically shown in FIG. 7F.

Referring generally to FIG. 5 and particularly to, e.g., FIG. 7E for illustrative purposes only and not by way of limitation, according to method 300, (block 370) draping first beam prepreg sheet 430 over door-forming tool 500 is performed while precursor frame sheet 410 is already draped over door-forming tool 500. The preceding portion of this paragraph characterizes example 32 of the subject matter, disclosed herein, where example 32 also encompasses example 31, above.

Door-forming tool 500 is used to form multiple components of composite door 100, such as composite skin 150, first composite side beam 130, and second composite side beam 140. First, this simultaneous processing reduces the overall processing time, needed to form all components of composite door 100. Second, this simultaneous processing eliminates the need for multiple tools. Specifically, skin prepreg sheet 420 is used to form composite skin 150, first beam prepreg sheet 430 is used to form first composite side beam 130, and second beam prepreg sheet 440 is used to form second composite side beam 140. In some examples, these multiple components are formed at the same time on door-forming tool 500.

Referring generally to FIG. 5 and particularly to, e.g., FIGS. 7E and 7F for illustrative purposes only and not by way of limitation, according to method 300, (block 374) forming first composite side beam 130 and second composite side beam 140 and forming composite frame 110 (block 330) are performed simultaneously. The preceding portion of this paragraph characterizes example 33 of the subject matter, disclosed herein, where example 33 also encompasses example 31 or 32, above.

Door-forming tool 500 is used to form multiple components of composite door 100, such as both of composite skin 150, composite frame 110, first composite side beam 130, and second composite side beam 140, at the same time. First, this simultaneous processing reduces the overall processing time, needed to form all components of composite door 100. Second, this simultaneous processing eliminates the need for multiple tools. Specifically, skin prepreg sheet 420 is used to form composite skin 150, while precursor frame sheet 410 is used to form composite frame 110, first beam prepreg sheet 430 is used to form first composite side beam 130, and second beam prepreg sheet 440 is used to form second composite side beam 140. In some examples, the same processing conditions (e.g., curing temperature and duration) are used for composite skin 150 and forming composite frame 110.

Referring generally to FIG. 5 and particularly to, e.g., FIGS. 2F and 2G for illustrative purposes only and not by way of limitation, according to method 300, (block 350) interconnecting composite frame 110, first composite edge fittings 120, second composite edge fittings 122, first composite side beam 130, second composite side beam 140, and composite skin 150 comprises (block 352) connecting first composite side beam 130 to composite frame 110 and connecting second composite side beam 140 to composite frame 110. The preceding portion of this paragraph characterizes example 34 of the subject matter, disclosed herein, where example 34 also encompasses any one of examples 25 to 33, above.

The connection between composite frame 110 and each of first composite side beam 130 and second composite side beam 140 provides additional rigidity to composite frame 110. This connection enables the use of lighter structures for composite frame 110, first composite side beam 130, and second composite side beam 140.

In some examples, composite frame 110 directly interfaces and is stacked with first composite side beam 130, e.g., is shown in FIG. 2G. For example, composite frame 110 is positioned between one of first composite edge fittings 120 and first composite side beam 130. In some examples, the connection between composite frame 110 and first composite side beam 130 also interconnects the one of first composite edge fittings 120.

Furthermore, in some examples, composite frame 110 directly interfaces and is stacked with second composite side beam 140, e.g., is shown in FIG. 2F. For example, composite frame 110 is positioned between one of second composite edge fittings 122 and second composite side beam 140. In some examples, the connection between composite frame 110 and second composite side beam 140 also interconnects the one of second composite edge fittings 122.

Referring generally to FIG. 5 and particularly to, e.g., FIG. 2G for illustrative purposes only and not by way of limitation, according to method 300, first composite side beam 130 comprises first-beam base 131 and two first-beam sides 132, non-parallel to first-beam base 131. Composite frame 110 comprises first rail 111, second rail 112, and crossbeams 113, extending between first rail 111 and second rail 112. Also according to method 300, (block 352) connecting first composite side beam 130 to composite frame 110 comprises (block 354) connecting a first one of two first-beam sides 132 to first rail 111. The preceding portion of this paragraph characterizes example 35 of the subject matter, disclosed herein, where example 35 also encompasses example 34, above.

The connection between composite frame 110 and first composite side beam 130 provides additional rigidity to composite frame 110, in particular, around first rail 111 of composite frame 110. This connection enables the use of lighter structures for composite frame 110 and first composite side beam 130, as well as other components.

In some examples, first rail 111 of composite frame 110 directly interfaces and is stacked with first composite side beam 130, e.g., is shown in FIG. 2G. For example, first rail 111 is positioned between one of first composite edge fittings 120 (e.g., one of two first side walls 124 of this first composite edge fitting) and first composite side beam 130. In some examples, the connection between first rail 111 and first composite side beam 130 also interconnects the one of first composite edge fittings 120.

Referring generally to FIG. 5 and particularly to, e.g., FIG. 2F for illustrative purposes only and not by way of limitation, according to method 300, (block 350) interconnecting composite frame 110, first composite edge fittings 120, second composite edge fittings 122, first composite side beam 130, second composite side beam 140, and composite skin 150 comprises (block 356) connecting a second one of two first-beam sides 132 of first composite side beam 130 to composite skin 150. The preceding portion of this paragraph characterizes example 36 of the subject matter, disclosed herein, where example 36 also encompasses example 35, above.

The connection between composite frame 110 and second composite side beam 140 provides additional rigidity to composite frame 110, in particular, around second rail 112 of composite frame 110. This connection enables the use of lighter structures for composite frame 110 and second composite side beam 140.

In some examples, second rail 112 of composite frame 110 directly interfaces and is stacked with second composite side beam 140, e.g., is shown in FIG. 2F. For example, second rail 112 is positioned between one of second composite edge fittings 122 (e.g., one of two second side walls 127 of this second composite edge fitting) and second composite side beam 140. In some examples, the connection between second rail 112 and second composite side beam 140 also interconnects the one of second composite edge fittings 122.

Referring generally to FIG. 5 and particularly to, e.g., FIG. 2G for illustrative purposes only and not by way of limitation, according to method 300, (block 350) interconnecting composite frame 110, first composite edge fittings 120, second composite edge fittings 122, first composite side beam 130, second composite side beam 140, and composite skin 150 comprises (block 357) connecting first-beam base 131 of first composite side beam 130 to each of first composite edge fittings 120. The preceding portion of this paragraph characterizes example 37 of the subject matter, disclosed herein, where example 37 also encompasses example 35 or 36, above.

The connection between composite frame 110 and first composite side beam 130 provides additional rigidity to composite frame 110, in particular, around first rail 111 of composite frame 110 and also around composite skin 150 and first composite edge fittings 120. Furthermore, first-beam base 131 provides spacing between two first-beam sides 132 and, as a result, spacing between first rail 111 and composite skin 150, thereby improving the overall mechanical strength of composite door 100. This connection enables the use of lighter structures for composite frame 110, first composite side beam 130, and composite skin 150.

As shown in FIG. 2G, first-beam base 131 extends between and interconnects two first-beam sides 132. Two first-beam sides 132 are non-parallel to first-beam base 131. In some examples, two first-beam sides 132 are parallel to each other, e.g., when first rail 111 is parallel to a corresponding portion of composite skin 150.

Referring generally to FIG. 5 and particularly to, e.g., FIG. 2F for illustrative purposes only and not by way of limitation, according to method 300, (block 350) interconnecting composite frame 110, first composite edge fittings 120, second composite edge fittings 122, first composite side beam 130, second composite side beam 140, and composite skin 150 comprises (block 358) connecting composite frame 110 to composite skin 150. The preceding portion of this paragraph characterizes example 38 of the subject matter, disclosed herein, where example 38 also encompasses any one of examples 25 to 34, above.

The connection between composite frame 110 and second composite side beam 140 provides additional rigidity to composite frame 110, in particular, around second rail 112 of composite frame 110 and also around composite skin 150 and second composite edge fittings 122. Furthermore, second-beam base 141 provides spacing between two second-beam sides 142 and, as a result, spacing between second rail 112 and composite skin 150, thereby improving the overall mechanical strength of composite door 100. This connection enables the use of lighter structures for composite frame 110, second composite side beam 140, second composite edge fittings 122, and composite skin 150.

As shown in FIG. 2F, second-beam base 141 extends between and interconnects two second-beam sides 142. Two second-beam sides 142 are non-parallel to second-beam base 141. In some examples, two second-beam sides 142 are parallel to each other, e.g., when second rail 112 is parallel to a corresponding portion of composite skin 150.

Referring generally to FIG. 5 and particularly to, e.g., FIG. 3A for illustrative purposes only and not by way of limitation, according to method 300, composite frame 110 comprises first rail 111, second rail 112, and crossbeams 113, joining first rail 111 and second rail 112. Crossbeams 113 of composite frame 110 comprise major portions 114, non-parallel to first rail 111 and second rail 112 and extending to composite skin 150. Crossbeams 113 of composite frame 110 further comprise skin-support portions 115, each connected and non-parallel to a corresponding one of major portions 114 of crossbeams 113. Also according to method 300, (block 358) connecting composite frame 110 to composite skin 150 comprises (block 359) connecting each of skin-support portions 115 of crossbeams 113 to composite skin 150. The preceding portion of this paragraph characterizes example 39 of the subject matter, disclosed herein, where example 39 also encompasses example 38, above.

Skin-support portions 115 provide an interface with composite skin 150 for attachment of composite skin 150 to composite frame 110 and provide support to composite skin 150, e.g., between first composite side beam 130 and second composite side beam 140. As a result of the aforementioned attachment and support, composite skin 150 can be made of a light-weight material, while being capable of carrying critical loads (e.g., pressure differentials across composite skin 150).

In some examples, each of skin-support portions 115 conforms to a corresponding portion of composite skin 150, thereby providing attachment interfaces between composite skin 150 and composite frame 110. Skin-support portions 115 extend between first composite side beam 130 and second composite side beam 140 or at least between first composite edge fittings 120 and second composite edge fittings 122.

Referring generally to FIG. 5 and particularly to, e.g., FIG. 3A for illustrative purposes only and not by way of limitation, according to method 300, (block 350) interconnecting composite frame 110, first composite edge fittings 120, second composite edge fittings 122, first composite side beam 130, second composite side beam 140, and composite skin 150 comprises (block 351) connecting each of first composite edge fittings 120 to composite frame 110, to first composite side beam 130, and to composite skin 150 and also (block 353) connecting each of second composite edge fittings 122 to each of composite frame 110, second composite side beam 140, and composite skin 150. The preceding portion of this paragraph characterizes example 40 of the subject matter, disclosed herein, where example 40 also encompasses any one of examples 25 to 34, above.

First composite edge fittings 120 and second composite edge fittings 122 enable interconnection of multiple components of composite door 100, e.g., composite frame 110, first composite side beam 130, second composite side beam 140, and composite skin 150. Specifically, first composite edge fittings 120 and second composite edge fittings 122 ensure load transfer between these components.

Referring generally to FIG. 5 and particularly to, e.g., FIG. 2G for illustrative purposes only and not by way of limitation, according to method 300, first composite side beam 130 comprises first-beam base 131 and two first-beam sides 132, non-parallel to first-beam base 131, Also according to method 300, (block 351) connecting each of first composite edge fittings 120 to composite frame 110, to first composite side beam 130, and to composite skin 150 comprises (block 355) connecting each of first composite edge fittings 120 to first-beam base 131 of first composite side beam 130. The preceding portion of this paragraph characterizes example 41 of the subject matter, disclosed herein, where example 41 also encompasses example 40, above.

The connection between composite frame 110 and first composite side beam 130 provides additional rigidity to composite frame 110, in particular, around first rail 111 of composite frame 110 and also around composite skin 150 and first composite edge fittings 120. Furthermore, first-beam base 131 provides spacing between two first-beam sides 132 and, as a result, spacing between first rail 111 and composite skin 150, thereby improving the overall mechanical strength of composite door 100. This connection enables the use of lighter structures for composite frame 110, first composite side beam 130, and composite skin 150.

As shown in FIG. 2G, first-beam base 131 extends between and interconnects two first-beam sides 132. Two first-beam sides 132 are non-parallel to first-beam base 131. In some examples, two first-beam sides 132 are parallel to each other, e.g., when first rail 111 is parallel to a corresponding portion of composite skin 150.

Referring generally to FIG. 5 and particularly to, e.g., FIGS. 2H and 2I for illustrative purposes only and not by way of limitation, according to method 300, composite frame 110 comprises first rail 111, second rail 112, and crossbeams 113, joining first rail 111 and second rail 112. Crossbeams 113 of composite frame 110 comprise major portions 114, non-parallel to first rail 111 and second rail 112 and extending to composite skin 150. Also according to method 300, (block 351) connecting each of first composite edge fittings 120 to composite frame 110, to first composite side beam 130, and to composite skin 150 comprises (block 380) connecting each of first composite edge fittings 120 to a corresponding one of major portions 114 of crossbeams 113. The preceding portion of this paragraph characterizes example 42 of the subject matter, disclosed herein, where example 42 also encompasses example 40, above.

Different walls of first composite edge fittings 120 enable interconnection of multiple components of composite door 100, e.g., a combination of side walls and base wall of first composite edge fittings 120 provides robust connections to composite frame 110, which is one of main structural components of composite door 100. Specifically, each one of first composite edge fittings 120 supports corresponding portion of composite frame 110 thereby enhancing the strength of each component of composite frame 110 (e.g., major portions 114). The connections, provided by first composite edge fittings 120, simplify the design and fabrication of other components of composite door 100. The connections can be formed by various means, such as adhesive, fasteners, and the like, as further described below.

Referring generally to FIG. 5 and particularly to, e.g., FIG. 2H for illustrative purposes only and not by way of limitation, according to method 300, each of first composite edge fittings 120 comprises first base wall 123, two first side walls 124, and first end wall 125. Two first side walls 124 are interconnected by first base wall 123 and first end wall 125. Also according to method 300, (block 351) connecting each of first composite edge fittings 120 to composite frame 110, to first composite side beam 130, and to composite skin 150 comprises (block 381) connecting first base wall 123 and a first one of two first side walls 124 of each of first composite edge fittings 120 to a corresponding one of crossbeams 113. The preceding portion of this paragraph characterizes example 43 of the subject matter, disclosed herein, where example 43 also encompasses example 42, above.

Multiple walls (e.g., first base wall 123, two first side walls 124, and first end wall 125) of first composite edge fittings 120 enable interconnection of multiple components of composite door 100. The connections, provided by first composite edge fittings 120, simplify the design and fabrication of other components of composite door 100.

In some examples, the first one of two first side walls 124 is connected to crossbeam 113 of composite frame 110 as, e.g., is shown in FIG. 2H. The connection can be formed by various means, such as adhesive, fasteners, and the like, as further described below.

In a similar manner, each of second composite edge fittings 122 comprises second base wall 126, two second side walls 127, and second end wall 128. These multiple walls of second composite edge fittings 122 enable interconnection of multiple components of composite door 100. The connections, provided by second composite edge fittings 122, simplify the design and fabrication of other components of composite door 100.

Referring generally to FIG. 5 and particularly to, e.g., FIG. 2H for illustrative purposes only and not by way of limitation, according to method 300, (block 351) connecting each of first composite edge fittings 120 to composite frame 110, to first composite side beam 130, and to composite skin 150 comprises (block 382) connecting a second one of two first side walls 124 of each of first composite edge fittings 120 to composite skin 150. The preceding portion of this paragraph characterizes example 44 of the subject matter, disclosed herein, where example 44 also encompasses example 43, above.

Multiple walls of first composite edge fittings 120 enable interconnection of multiple components of composite door 100, e.g., a combination of two first side walls 124 of first composite edge fittings 120 interconnects composite skin 150 and composite frame 110. Specifically, each one of first composite edge fittings 120 supports a corresponding portion of composite skin 150 relative to composite frame 110 thereby enhancing the strength of composite skin 150. The connections, provided by first composite edge fittings 120, simplify the design and fabrication of other components of composite door 100. The connections can be formed by various means, such as adhesive, fasteners, and the like, as further described below.

Referring generally to FIG. 5 and particularly to, e.g., FIG. 2H for illustrative purposes only and not by way of limitation, according to method 300, (block 351) connecting each of first composite edge fittings 120 to composite frame 110, to first composite side beam 130, and to composite skin 150 comprises (block 383) connecting first end wall 125 of each of first composite edge fittings 120 to first composite side beam 130. The preceding portion of this paragraph characterizes example 45 of the subject matter, disclosed herein, where example 45 also encompasses example 44, above.

Multiple walls of first composite edge fittings 120 enable interconnection of multiple components of composite door 100, e.g., a combination of one of two first side walls 124 and first end wall 125 of first composite edge fittings 120 interconnects first composite side beam 130 and composite frame 110. Specifically, each one of first composite edge fittings 120 supports corresponding portion of composite frame 110 and composite skin 150 relative to first composite side beam 130 thereby enhancing the strength of each one of these components at this connection interface. The connections, provided by first composite edge fittings 120, simplify the design and fabrication of other components of composite door 100. The connections can be formed by various means, such as adhesive, fasteners, and the like, as further described below.

Referring generally to FIG. 5 and particularly to, e.g., FIGS. 8 and 9 for illustrative purposes only and not by way of limitation, according to method 300, (block 350) interconnecting composite frame 110, first composite edge fittings 120, second composite edge fittings 122, first composite side beam 130, second composite side beam 140, and composite skin 150 comprises (block 384) interconnecting, with fasteners 190, composite frame 110, first composite edge fittings 120, second composite edge fittings 122, first composite side beam 130, second composite side beam 140, and composite skin 150. The preceding portion of this paragraph characterizes example 46 of the subject matter, disclosed herein, where example 46 also encompasses example 44 or 45, above.

Fasteners 190 are used to interconnect various components of composite door 100 and to ensure load transfer between these components, such as between composite skin 150 and crossbeams 113, between composite skin 150 and first composite side beam 130, and between composite skin 150 and second composite side beam 140. Furthermore, fasteners 190 enable interconnection of components, made from different types of materials, e.g., composites and metals. Some examples of fasteners 190 include, but are not limited to, rivets, bolt-nut assemblies, and the like.

Referring generally to FIG. 5 and particularly to, e.g., FIGS. 8 and 9 for illustrative purposes only and not by way of limitation, according to method 300, (block 350) interconnecting composite frame 110, first composite edge fittings 120, second composite edge fittings 122, first composite side beam 130, second composite side beam 140, and composite skin 150 comprises (block 385) interconnecting, with adhesive 192, composite frame 110, first composite edge fittings 120, second composite edge fittings 122, first composite side beam 130, second composite side beam 140, and composite skin 150. The preceding portion of this paragraph characterizes example 47 of the subject matter, disclosed herein, where example 47 also encompasses any one of examples 44 to 46, above.

Adhesive 192 enables interconnection of various components of composite door 100 and ensure load transfer between these components without forming holes or other features in these components. Furthermore, the weight of adhesive 192 is generally less than that of other types of fasteners, which is important for various applications, such aircraft. Referring to FIG. 2K, adhesive 192 is disposed between composite skin 150 and each of crossbeams 113 and connects composite skin 150 and each of crossbeams 113. Adhesive 192 is also disposed between composite skin 150 and first composite side beam 130, e.g., along the entire length of first composite side beam 130. Furthermore, adhesive 192 is disposed between composite skin 150 and second composite side beam 140, e.g., along the entire length of second composite side beam 140.

Examples of the subject matter, disclosed herein, may be described in the context of aircraft manufacturing and service method 1100 as shown in FIG. 8 and aircraft 1102 as shown in FIG. 9. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 9, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s), disclosed herein, may include any of the components, features, and functionalities of any of the other examples of the apparatus(es) and method(s) disclosed herein in any combination.

Many modifications of examples, set forth herein, will come to mind of one skilled in the art, having the benefit of the teachings, presented in the foregoing descriptions and the associated drawings.

Therefore, it is to be understood that the subject matter, disclosed herein, is not to be limited to the specific examples illustrated and that modifications and other examples are intended to be included within the scope of the appended claims. Moreover, although the foregoing description and the associated drawings describe examples of the subject matter, disclosed herein, in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided herein.

What is claimed is:

1. A composite door, comprising:
a composite frame, comprising a first rail, a second rail, and crossbeams, joining the first rail and the second rail;
a first composite side beam comprising a first-beam base and two first-beam sides, non-parallel to the first-beam base, wherein a first one of the two first-beam sides is connected to the first rail of the composite frame and a second one of the two first-beam sides is connected to a composite skin;
a second composite side beam;
the composite skin, connected to each of the crossbeams of the composite frame, to the first composite side beam, and to the second composite side beam;
first composite edge fittings, each connected to a corresponding one of the crossbeams of the composite frame, to the first composite side beam first-beam base, and to the composite skin; and
second composite edge fittings, each connected to a corresponding one of the crossbeams of the composite frame, to the second composite side beam, and to the composite skin.

2. The composite door according to claim 1, wherein:
the first composite side beam is connected to the first rail of the composite frame; and
the second composite side beam is connected to the second rail of the composite frame.

3. The composite door according to claim 1, wherein the composite skin is connected, using adhesive, to each of the crossbeams of the composite frame, to the first composite side beam, and to the second composite side beam.

4. The composite door according to claim 1, wherein:
the second composite side beam comprises a second-beam base and two second-beam sides, non-parallel to the second-beam base;
the second-beam base is connected to each of the second composite edge fittings;
a first one of the two second-beam sides is connected to the second rail of the composite frame; and
a second one of the two second-beam sides is connected to the composite skin.

5. The composite door according to claim 1, wherein the crossbeams of the composite frame comprise major portions, non-parallel to the first rail and to the second rail and extending to the composite skin.

6. The composite door according to claim 5, wherein the major portions of the crossbeams extend between the composite skin and each of the first rail and the second rail.

7. The composite door according to claim 5, wherein:
the crossbeams of the composite frame further comprise skin-support portions, each extending from and non-parallel to a corresponding one of the major portions of the crossbeams; and
each of the skin-support portions of the crossbeams is connected to the composite skin.

8. The composite door according to claim 7, wherein each of the skin-support portions of the crossbeams extends from a corresponding one of the major portions of the crossbeams along the composite skin.

9. The composite door according to claim 7, wherein:
the skin-support portions of the crossbeams comprise first skin-support portions and second skin-support portions;
each of the first skin-support portions of the crossbeams extends from a corresponding one of the major portions of the crossbeams in a first direction along the composite skin; and
each of the second skin-support portions of the crossbeams extends from a corresponding one of the major portions of the crossbeams in a second direction along the composite skin, opposite of the first direction.

10. The composite door according to claim 1, wherein each of the first rail and the second rail is parallel to the composite skin.

11. The composite door according to claim 1, wherein:
the composite skin is curved; and
each of the first composite side beam and the second composite side beam are geometrically complementary with the composite skin.

12. The composite door according to claim 1, wherein each of the crossbeams of the composite frame is geometrically complementary with the composite skin.

13. The composite door according to claim 1, wherein the composite skin is connected, using fasteners, to each of the crossbeams of the composite frame, to the first composite side beam, and to the second composite side beam.

14. The composite door according to claim 13, wherein:
each of the first composite edge fittings is connected, using a first set of the fasteners, to the corresponding one of the crossbeams of the composite frame, to the first composite side beam, and to the composite skin; and
each of the second composite edge fittings is connected, using a second set of the fasteners, to the corresponding one of the crossbeams of the composite frame, to the second composite side beam, and to the composite skin.

15. The composite door according to claim 1, wherein the composite skin is curved.

16. A composite door comprising:
a composite frame, comprising a first rail, a second rail, and crossbeams, joining the first rail and the second rail;
a first composite side beam;
a second composite side beam;
a composite skin, connected to each of the crossbeams of the composite frame, to the first composite side beam, and to the second composite side beam;
first composite edge fittings, each connected to a corresponding one of the crossbeams of the composite frame, to the first composite side beam, and to the composite skin; and
second composite edge fittings, each connected to a corresponding one of the crossbeams of the composite frame, to the second composite side beam, and to the composite skin,
wherein each one of the first composite edge fittings comprises a first base wall, two first side walls, and a first end wall;
wherein the two first side walls are interconnected by the first base wall and by the first end wall; and wherein a first one of the two first side walls is connected to the composite frame.

17. The composite door according to claim 16, wherein a second one of the two first side walls of each one of the first composite edge fittings is connected to the composite skin.

18. The composite door according to claim 16, wherein the first end wall of each one of the first composite edge fittings is connected to the first composite side beam.

19. The composite door according to claim 16, wherein:
the crossbeams of the composite frame comprise major portions and skin-support portions;
each of the skin-support portions of the crossbeams is connected to and is non-parallel to a corresponding one of the major portions of the crossbeams; and
the first base wall of each of the first composite edge fittings is connected to a corresponding one of the major portions of the crossbeams.

20. The composite door according to claim 19, wherein the two first side walls of each of the first composite edge fittings and a corresponding one of the skin-support portions of the crossbeams extend in opposite directions.

\* \* \* \* \*